United States Patent [19]

Thode

[11] 4,252,607
[45] Feb. 24, 1981

[54] RADIATION SOURCE

[75] Inventor: Lester E. Thode, Los Alamos, N. Mex.

[73] Assignee: The United States of America as represented by the United States Department of Energy, Washington, D.C.

[21] Appl. No.: 9,701

[22] Filed: Feb. 5, 1979

[51] Int. Cl.³ ............................................. G21B 1/00
[52] U.S. Cl. ............................................. 176/1; 176/5
[58] Field of Search .................. 250/402, 499–502; 313/61 R, 61 S; 328/233–238, 256; 179/1, 3, 9, 5

[56] References Cited

PUBLICATIONS

Phys. of Fluids, vol. 19, No. 6, (6/76), pp. 831–848, Thode, Plasma Heating by Relativistic Electron Beams.
Nuclear Fusion Suppl., (1977), vol. 2, p. 543, Thode II.
J. Appl. Phys., vol. 44, No. 11, (11/73), pp. 4913–4919, Mather et al.
Sov. Tech. Phys. Lett., vol. 2, No. 1, (1/76), pp. 20–22, Kiselev et al.
Physics of Fluids, vol. 20, No. 12, (12/77), pp. 2121–2127, Thode III.

*Primary Examiner*—S. A. Cangialosi
*Attorney, Agent, or Firm*—James E. Denny; Paul D. Gaetjens; William W. Cochran, II

[57] ABSTRACT

A device and method for relativistic electron beam heating of a high-density plasma in a small localized region. A relativistic electron beam generator or accelerator produces a high-voltage electron beam which propagates along a vacuum drift tube and is modulated to initiate electron bunching within the beam. The beam is then directed through a low-density gas chamber which provides isolation between the vacuum modulator and the relativistic electron beam target. The relativistic beam is then applied to a high-density target plasma which typically comprises DT, DD, or similar thermonuclear gas at a density of $10^{17}$ to $10^{20}$ electrons per cubic centimeter. The target gas is ionized prior to application of the relativistic electron beam by means of a laser or other preionization source to form a plasma. Utilizing a relativistic electron beam with an individual particle energy exceeding 3 MeV, classical scattering by relativistic electrons passing through isolation foils is negligible. As a result, relativistic streaming instabilities are initiated within the high-density target plasma causing the relativistic electron beam to efficiently deposit its energy into a small localized region of the high-density plasma target.

30 Claims, 40 Drawing Figures

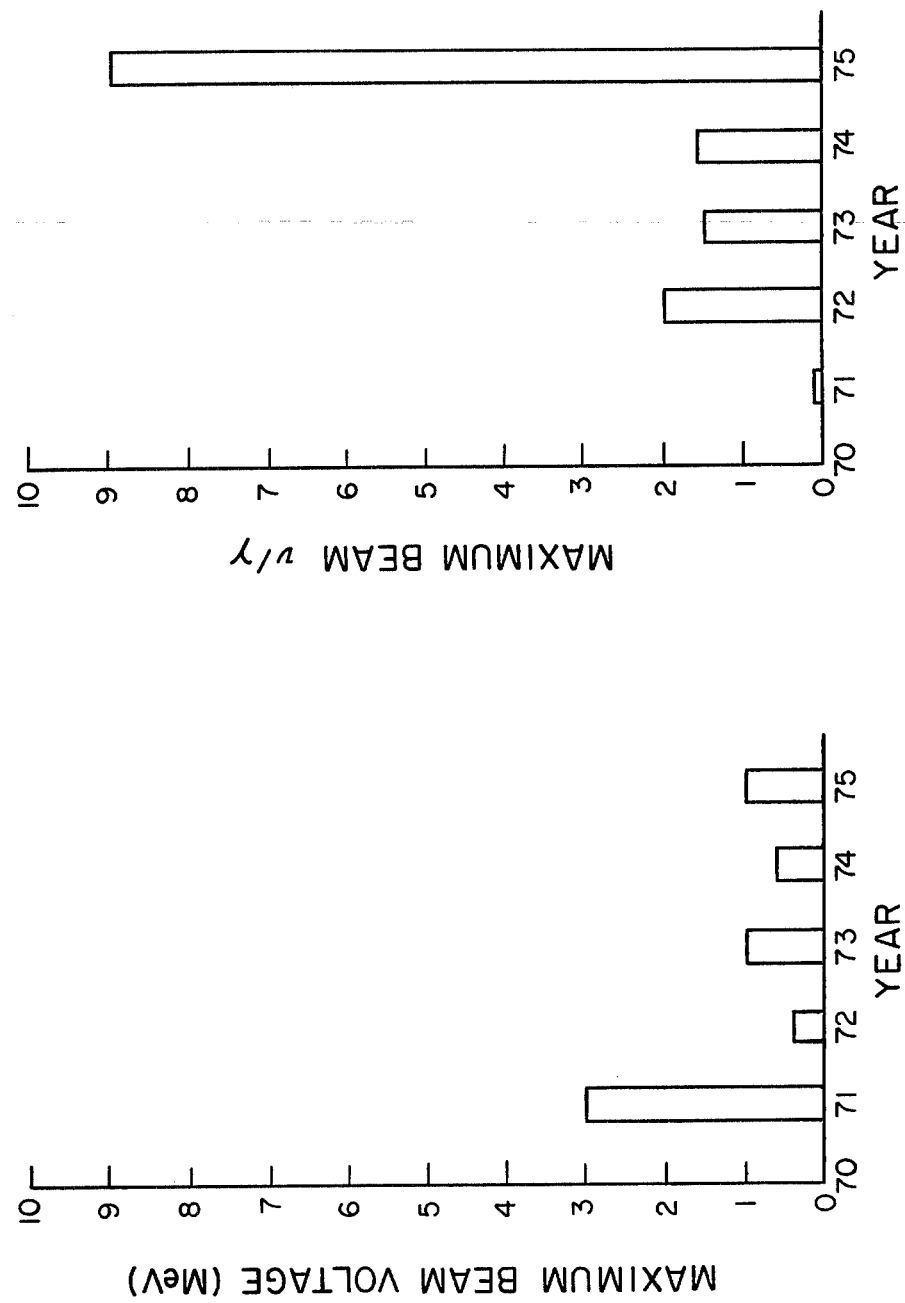

FOIL SCATTERING FUNCTION

| X(μm) | 127.0 | 254.0 | 508.0 | 762.0 | 1270.0 | 2540.0 |
|---|---|---|---|---|---|---|
| DEUTERIUM TRITIUM 50/50 | 0.00447 | 0.0114 | 0.0276 | 0.0455 | 0.0843 | 0.191 |

| X(μm) | 12.7 | 25.4 | 50.8 | 76.2 | 127.0 | 254.0 |
|---|---|---|---|---|---|---|
| MYLAR | 0.0111 | 0.0292 | 0.0716 | 0.119 | 0.221 | 0.504 |
| KAPTON | 0.0115 | 0.0300 | 0.0735 | 0.122 | 0.227 | 0.517 |
| BERYLLIUM | 0.00944 | 0.0245 | 0.0597 | 0.0987 | 0.183 | 0.417 |
| GRAPHITE | 0.0211 | 0.0526 | 0.125 | 0.205 | 0.378 | 0.852 |
| ALUMINUM | 0.0541 | 0.132 | 0.310 | 0.505 | 0.924 | 2.07 |
| TITANIUM | 0.168 | 0.397 | 0.913 | 1.47 | 2.67 | 5.91 |

Fig. 9

RADIATION SOURCE

BACKGROUND OF THE INVENTION

Fast liners disposed in the high-density target plasma are explosively or ablatively driven to implosion by a heated annular plasma surrounding the fast liner generated by an annular relativistic electron beam. An azimuthal magnetic field produced by axial current flow in the annular plasma, causes the energy in the heated annular plasma to converge on the fast liner to implode the fast liner which can also be used to implode a microsphere.

Additionally, the high-temperature plasma can be used to heat a high Z material to generate radiation. Alternatively, a tunable radiation source is produced by using a moderate Z gas or a mixture of high Z and low Z gas as the target plasma.

The present invention pertains generally to dense plasma heating and more particularly to plasma heating by way of a relativistic electron beam to heat high Z materials to generate radiation.

Plasma heating has, for some time, been of great interest to the scientific community, since heated plasmas can be utilized for a wide variety of functions. A typical use of hot plasmas is the generation of energy in the form of radiation, neutrons, and alpha particles. Such an energy source can be useful in basic high-energy density plasma physics research, with practical application in scientific areas such as controlled thermonuclear fusion, material studies, and radiography.

Numerous techniques have been proposed in the prior art to produce dense, kilovolt plasmas. One of the more well-known techniques is the compression and heating of the core of a structured pellet by a laser or low-voltage electron beam. It has also been suggested that light- or heavy-ion beams could be utilized to obtain similar compression and heating. According to this technique, the structured pellet and its driving source are directly coupled through classical interactions by heating the outer layer of the structured pellet. Depending upon the characteristics of both the structured pellet and driving source, the outer layer explodes or ablates, leading to compression and heating of the core. Due to the direct coupling of all of these prior art driving sources, preheat of the core has been found to reduce the effectiveness of the compression, thereby reducing both density and temperature of the pellet core.

The use of a laser as a driving source in the above described confinement system has the added inherent disadvantages of low efficiency and associated high-development cost to produce lasers with the required power output for a directly driven structured pellet. Also, diffraction limitations and window damage thresholds make it difficult to focus proposed large lasers to millimeter diameters.

Low-impedance electron and light-ion beams also face expensive technological advancement to enable these beams to be focused to millimeter diameters, and to obtain power levels necessary to achieve the desired compression of the structured pellet. Low-impedance electron and light-ion sources are additionally limited in the manner of propagation of the beam to the pellet.

Heavy-ion sources also require significant technological advancement to produce the desired compression of the structured pellet. In fact, development of heavy-ion sources using conventional accelerator concepts appears to be considerably more expensive than the cost associated with the development of lasers. Beam propagation is also a limitation when employing heavy-ion sources.

High-density, kilovolt plasmas can also be produced by fast liners. Such devices can be driven by either magnetic forces or high explosives, both of which lead to compression and heating of a confined plasma. Although both of these fast liner techniques have produced energy in the form of radiation, neutrons, and alpha particles, each technique has its own inherent disadvantage. The primary disadvantage of the high explosive driven liner is that the high explosives have a maximum power density of approximately $10^{10}$ watts/cm$^3$ and a maximum detonation velocity of $8.8\times10^5$ cm/sec, which limits achievable liner implosion velocity. Although useful in obtaining scientific data, such a system would be difficult to develop into a reuseable apparatus.

Magnetically driven liners are fabricated such that the liner forms part of the electrical discharge circuit in which current flowing through the liner creates a large magnetic field causing the liner to compress. Since the liner forms part of the electrical circuit, the external circuit resistance and finite liner resistivity lead to ohmic losses which lower the efficiency of converting electrical energy into liner kinetic energy. Also, since the liner must make electrical contact with the circuit, damage to the electrode connection between the moving liner and the electrode limits operability.

For liners which essentially remain thin solid shells during the implosion, ohmic heating and magnetic field diffusion limits implosion velocities to approximately 1 cm/$\mu$sec. To obtain the desired radiation, neutron, and alpha particle output at such low implosion velocities, the plasma within the liner must be preionized and complex methods of overcoming heat conduction losses must be incorporated into the system.

Although liner implosion velocities exceeding 1 cm/$\mu$sec can be achieved, ohmic heating and magnetic field diffusion converts solid liners into plasmas during operation. As a result, the thickness of the liner is increased, which lowers the potential for power multiplication. Even with very thin foils, implosion velocities are limited by the risetime of the driving current and diffusion of the driving magnetic field through the plasma liner.

Lasers have also been used to directly heat a magnetically confined plasma. According to this concept, a laser is used to heat a large volume of plasma confined by an elaborate magnetic field system to thermonuclear temperatures. Although the laser provides uniform ionization and rapid heating of a low-temperature plasma, the characteristic deposition length increases approximately as $T^{3/2}$ for plasma electron temperatures $T>10$ eV. This characteristic of the deposition of laser energy in the plasma, coupled with the large volume of plasma to be heated, places a total energy requirement for the laser which substantially exceeds present technology. Even in such lasers could be developed, the inherent low efficiencies associated with generation of laser energy would result in a large-capital investment for such a system.

A similar system incorporates a light- or heavy-ion beam to deposit its energy in a magnetically confined plasma. Since such beams are nonrelativistic, they exhibit a very low coupling efficiency and lack versatility obtainable by the relativistic interaction.

The concept of using an intense relativistic electron beam to heat a confined plasma has been investigated experimentally for a number of years. Prior art experiments have concentrated primarily on heating a large volume of plasma to thermonuclear temperatures with an electron beam, while maintaining the plasma with an external magnetic field. A typical configuration of a prior art experimental apparatus is shown in FIG. 1. A cathode 10 is positioned within a vacuum chamber 12 which is separated from the plasma chamber 14 by an anode foil 16. A series of dielectric spacers 18 are separated by a series of metal plates 20, which function together to prevent breakdown between the cathode 10 and the diode support structure 22. A solenoidal or mirror magnetic field configuration 24 is produced by an external source.

In operation, a relativistic electron beam 26 is formed by charging the cathode 10 with a fast risetime high-voltage pulse, causing electrons to be field emitted from the cathode 10 penetrating the anode foil 16 so as to enter the plasma chamber 14 as a relativistic electron beam 26. As the relativistic beam propagates through the plasma along the externally applied axial magnetic field 24, the plasma is heated by the following methods:

(a) relaxation heating due to relativistic streaming instabilities (two-stream and upper-hybrid bunching instabilities); and, (b) anomalous resistive heating due to the presence of a plasma return current (ion-acoustic and ion-cyclotron instabilities).

Typically, devices such as klystrons, magnetrons, vacuum tubes, etc., which are based upon electron bunching according to method (a) have been considered very efficient devices with respect to energy utilization. Therefore, the process of heating a plasma by electron bunching, i.e., by generating the two-stream and upper-hybrid instabilities according to method (a), was initially expected to be an efficient technique for producing a thermonuclear plasma. Although all early experiments observed anomalous (nonclassical) coupling of the beam energy to the plasma resulting from the presence of the streaming instabilities according to the method (a), the coupling efficiency was only on the order of 15% at plasma densities of approximately $10^{12}$ electrons/cm$^3$, and dropped rapidly to less than a few percent as the plasma density approached $10^{14}$ electrons/cm$^3$. These results were obtained with anode foils having thicknesses on the order of 25 $\mu$m to 50 $\mu$m and conventional electron beams available for experiments during this period which typically had relatively low voltages, i.e., 1 MeV or less. This combination of relatively thick anode foils and low-voltage beams resulted in classical anode foil scattering of the beam which prevented the relativistic streaming instabilities from efficiently coupling the beam energy to the plasma. In other words, although unknown to the experimentalists and theoreticians during the period 1970-1975, the foil thickness and low voltage of the electron beams used in the experiments caused the electron beam to scatter in a manner which prevented substantial electron bunching in the beam. This, in turn, produced the observed rapidly decreasing energy absorption efficiencies as the plasma density approached $10^{14}$ electrons/cm$^3$. As a result of these low observed efficiencies, scientific attention shifted toward investigation of the resistive heating mechanism according to method (b), which has known to have several scientifically interesting properties.

One property of the resistive heating mechanism of method (b) is its ability to place a substantial fraction of the beam energy into plasma ions. This differs from the streaming instabilities which primarily heat the plasma electrons. Since the ions must eventually be heated in a magnetically contained plasma, according to conventional magnetic confinement systems, direct heating of the ions eliminates an energy conversion step. Furthermore, when energy is initially deposited into plasma electrons rather than the ions, heat conduction is enhanced due to the initially elevated electron temperature, so that achievable plasma confinement time is shortened. Consequently, increased magnetic field strengths are required to produce comparable confinement.

Another property of the resistive heating mechanism is its ability to heat a large volume of plasma in a uniform manner, rather than depositing energy in a small localized region, as is characteristic of the optimized streaming instability mechanism. The ability to directly heat a large volume of plasma in a uniform manner by resistive heating thus avoids problems of heat redistribution within the plasma. Moreover, the potential for developing a plasma heating system which could also be used in conjunction with devices requiring preheated plasmas, such as tokamaks which have received substantial funding, renders the resistive heating mechanism even more attractive. For these reasons, experimental attention was directed from the onset of plasma heating experiments using relativistic electron beams towards producing resistive heating in plasmas according to method (b). Consequently, experimental apparatus to optimize resistive heating effects, such as low-voltage electron beams with high $\nu/\gamma$ outputs, were utilized in ongoing experiments of relativistic electron beam heated plasmas. Here, $\gamma$ is the beam relativistic factor which is nearly proportional to the beam particle voltage. The ratio $\nu/\gamma$ is basically a measure of the beam self-magnetic field energy to beam particle energy. The increased use of high $\nu/\gamma$ beams is more graphically shown in FIGS. 2 and 3 which illustrate the decrease in maximum beam voltage and increase in maximum $\nu/\gamma$ for relativistic electron beam experiments between 1970 and 1975. Thus the prior art experiments have, from the beginning, concentrated on high $\nu/\gamma$, low-voltage beams for optimizing the resistive heating mechanism according to method (b), virtually ignoring the effect of streaming instabilities produced according to method (a).

In so doing, prior art experiments, have clearly pointed out the limitations of resistive heating according to method (b), i.e., that resistive heating does not scale to higher density plasmas, but, to the contrary, is absolutely limited by selfstabilization within the plasma. More particularly, the experiments have shown that above a certain electron temperature, depending on the density of the plasma, low-frequency instabilities which are responsible for resistive heating, are stabilized. Consequently, only classical resistivity, which is inadequate to couple significant energy to the plasma from the relativistic electron beam, has any effect in resistively heating the plasma.

In addition to this inherent stabilization limitation, the technique of resistive heating has several other disadvantages. First, even if experiments had shown that resistive heating according to method (b) was effective at high plasma density, the required $\nu/\gamma$ for efficient coupling would be at least an order-of-magnitude higher than that achievable by present day technology. Second, since resistive heating is only suitable for low plasma densities which are very large in volume, the total energy required to heat such a plasma would again, be at least an order-of-magnitude beyond the total beam energy achievable by present technology standards.

As a result of these limitations, and the belief by prior art theoreticians and experimentalists that resistive heating dominated anomalous energy deposition in plasmas, the relativistic electron beam plasma heating program in the United States was virtually abolished in 1975 without any further investigation into the streaming instability heating mechanism.

SUMMARY OF THE INVENTION

The present invention overcomes the disadvantages and limitations of the prior art by providing a device and method for electron beam heating of a high-density plasma to heat a high Z material to generate radiation or heating a moderate Z gas or high Z has mixed with a low Z gas to produce radiation. The present invention utilizes either an annular or solid relativistic electron beam to heat a plasma to kilovolt temperatures through streaming instabilities in the plasma. Energy deposited in the plasma then heats a high Z material, such as a wire array, to generate radiation. Heating of a moderate Z gas or mixture of a high Z gas with a low Z gas can be performed with either a solid or annular relativistic electron beam.

It is therefore an object of the present invention to provide a device and method for generating a hot plasma to generate radiation directly or heat a high Z material to generate radiation.

It is also an object of the present invention to provide a device and method for generating intense radiation which is efficient in operation.

Another object of the present invention is to provide a device and method for generating radiation.

Another object of the present invention is to provide a device and method for generating radiation which requires relatively low-capital investment.

Another object of the present invention is to provide a device and method for generating high-intensity radiation utilizing currently available technology.

Other objects and further scope of applicability of the present invention will become apparent from the detailed description given hereinafter. The detailed description, indicating the preferred embodiment of the invention is given only by way of illustration since various changes and modifications within the spirit and scope of the invention will become apparent to those skilled in the art from the detailed description. The foregoing abstract of the disclosure is for the purpose of providing a nonlegal brief statement to serve as a searching and scanning tool for scientists, engineers, and researchers and is not intended to limit the scope of the invention as disclosed herein, nor is it intended to be used in interpreting or in any way limiting the scope or fair meaning of the appended claims.

BRIEF DESCRIPTION OF THE DRAWINGS

FIG. 2 is a graph of maximum experimental relativistic electron beam voltages utilized from 1970 to 1975.

FIG. 3 is a graph of maximum experimental $v/\gamma$ of relativistic electron beams utilized from 1970 to 1975.

FIG. 9 is a table of the foil scattering function F for seven different materials having various thicknesses measured in microns.

DETAILED DESCRIPTION OF THE PREFERRED EMBODIMENT OF THE INVENTION

Central to the concept of the preferred embodiment of the invention is the rapid heating of a $10^{17}$–$10^{20}$ electron/cm$^3$, 3 cm$^3$ to 50 cm$^3$ of plasma by an intense, high-voltage relativistic electron beam. Efficient coupling is achieved through optimization and control of a very powerful collective wave interaction, which occurs naturally when a directed stream of electrons passes through a plasma.

The anomalous transfer of relativistic electron beam energy and momentum into thermal and directed plasma energy, respectively, is nonclassical and, therefore, the strength of the nonlinear state of the microinstabilities depends upon a large number of factors. The characteristic nonuniform energy deposition of the collective interaction is utilized to concentrate the energy in the plasma. In fact, the optimized relativistic electron beamplasma interaction is a power density multiplication process. Since energy is being transferred from relativistic beam electrons to nonrelativistic electrons in the plasma, conservation of energy and momentum require that the interaction both heat and drive a localized axial current in the plasma. The driven axial current, in turn, generates an azimuthal magnetic field.

If the relativistic beam is solid, the physical configuration is similar to a nonuniform dense Z pinch in which the azimuthal magnetic field provides confinement. However, in contrast to a classical Z pinch, the heating and confinement are anomalous in character. For an annular relativistic electron beam, the azimuthal magnetic field leads to a directed heat flow towards the axis of the device. In this configuration, the kilovolt plasma is used to heat a high Z material such as a wire array to generate radiation according to the present invention.

Figure 1:
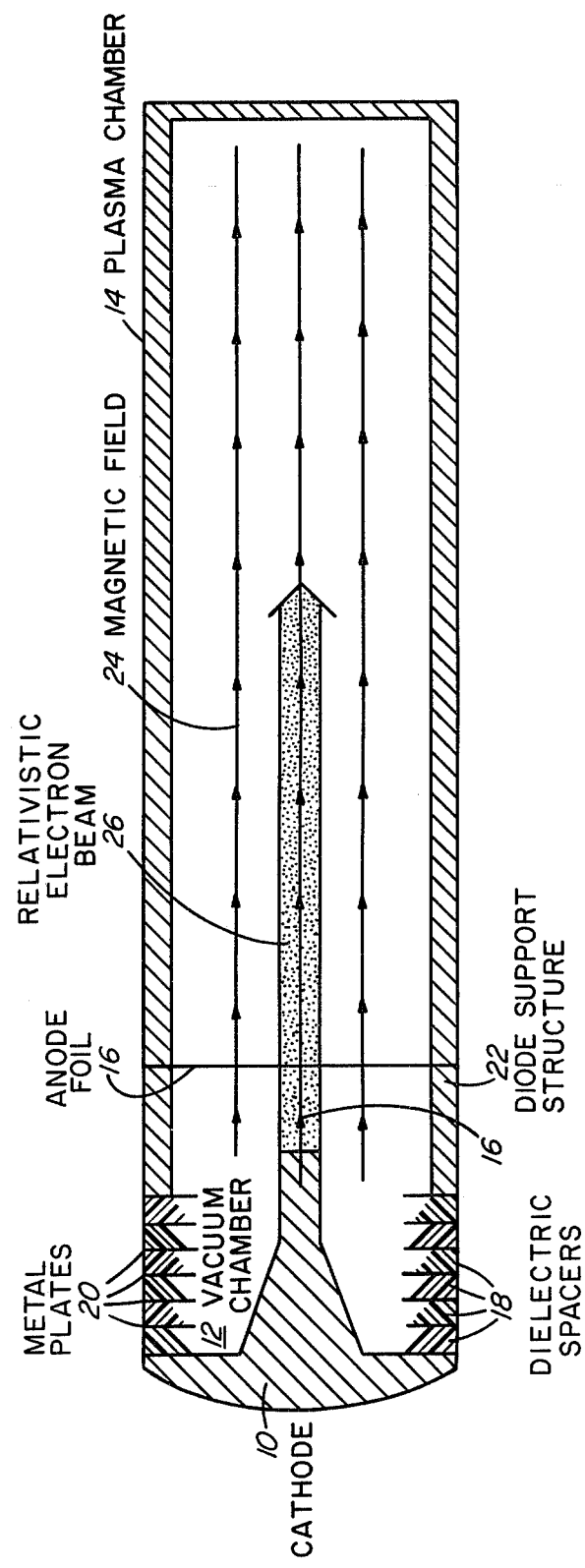
FIG. 1 is a schematic illustration of a typical prior art relativstic electron beam plasma heating device.
Figure 4:
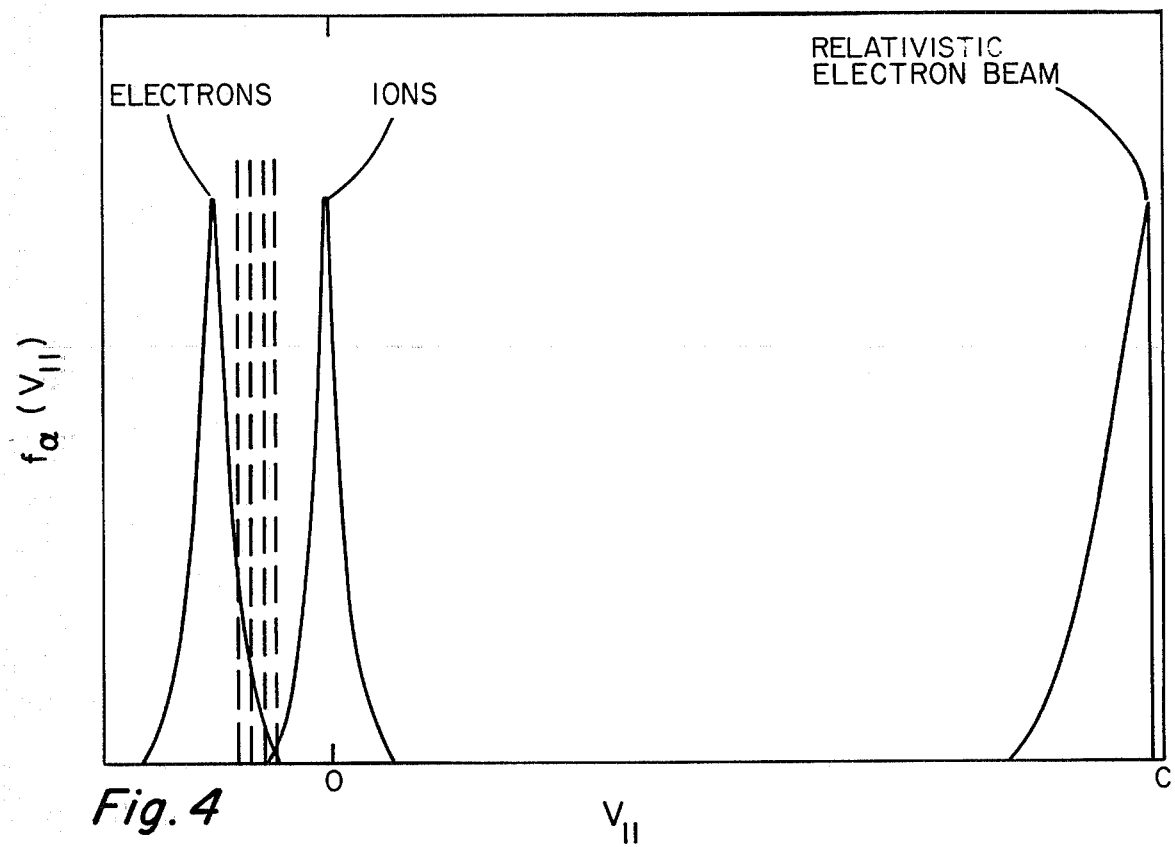
FIG. 4 is a graph illustrating the characteristic relationship between the relativistic electron beam and plasma ions and electrons for resistive heating according to method (b). The graph illustrates the component of velocity along the direction of beam propagation $V_\parallel$ (axis) versus the distribution function $f_a(V_\parallel)$ (ordinate).

Early theory by R. V. Lovelace and R. N. Sudan, Phys. Rev. Letter 27, 1256 (1971), indicated that resistive heating according to method (b) was a very efficient process for beams with $\nu/\gamma \gg 1$. As pointed out above, $\nu/\gamma$ is a measure of the beam self-magnetic field energy to the beam particle energy. Defining N as the line density of beam electrons and $r_e$ as the classical electron radius, $\nu \equiv Nr_e$ for a solid, constant density beam. The relativistic factor $\gamma = (1-\beta^2)^{-\frac{1}{2}}$ and $\beta = v/c$ are, in this manner, related to the beam velocity v and speed of light c. The basic idea behind anomalous resistive heating is that a $\nu/\gamma \gg 1$ beam cannot propagate since its self-magnetic field energy exceeds its particle energy. But, when such a beam is injected into a plasma, it neutralizes this characteristically large self-magnetic field energy by inducing a plasma return current. The relationship between the plasma and beam species in velocity space for a magnetically neutralized beam is shown in FIG. 4. Due to the relative drift between the plasma electron and ion species, ion-acoustic and/or ion-cyclotron waves are generated, as illustrated in FIG. 4 by the dashed lines. Such microturbulence is known to manifest itself as anomalous resistance. Thus, the plasma is heated at a rate $$dW_p/dt = \eta^* J_p^2, \quad (1)$$

where $W_p$ is the plasma energy density, $\eta^*$ is the anomalous resistivity, and $J_p$ is the plasma return current density. At the same time, the macroscopic electric field which maintains the return current, in order for the beam to propagate, removes energy from the beam. In this fashion, energy is transferred from the beam and deposited into plasma electrons and ions.

Figure 5:
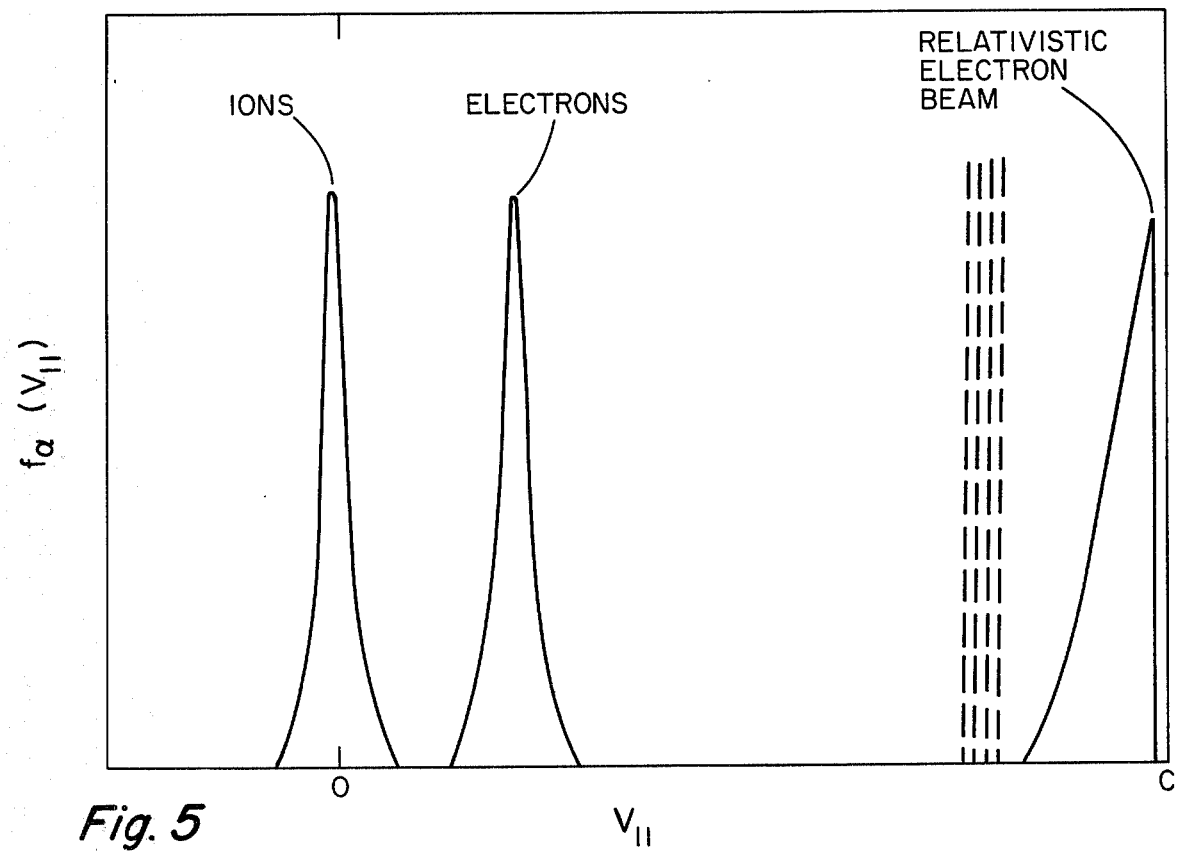
FIG. 5 is a graph illustrating the characteristic relationship between the relativistic electron beam and plasma ions and electrons for relaxation heating according to method (a) of the present invention. The graph illustrates the component velocity along the direction of beam propagation $V_\parallel$ (axis) versus the distribution function $f_a(V_\parallel)$ (ordinate).

In contrast to resistive heating described above, relaxation heating according to method (a) results from the relative drift between the relativistic beam electrons and plasma electrons. Optimally, these instabilities take the form of electron bunching at a wavelength of $$\lambda \approx (1-4)[10^{20}/n_e(cm^{-3})]^{\frac{1}{2}} \mu m \quad (2)$$

and a frequency of $$f \approx [n_e(cm^{-3})/10^{16}] THz, \quad (3)$$

where $n_e$ is the plasma electron density. The characteristic relationship between the plasma and beam species for optimized relaxation heating is illustrated in FIG. 5. Locally, the net current $I_{net}$ within the beam channel can exceed the beam current $I_b$, in contrast to the magnetically neutralized beam where $I_{net} \cong 0$ within the beam channel. As stated, this current multiplication is a consequence of momentum conservation, and is a very localized phenomenon. The location of the unstable spectrum for these instabilities is indicated by dashed lines in FIG. 5.

The present invention, in contrast to prior art plasma heating techniques takes advantage of the natural characteristics of two extremely powerful microinstabilities, i.e., the two-stream and upper-hybrid instabilities illustrated in FIG. 5, to locally heat a moderate Z or mixture of low Z and high Z plasma to generate radiation directly. Alternatively, the relativistic electron beam is used to heat a high-density plasma to kilovolt temperatures to heat a high Z material such as a wire array to generate radiation. In both embodiments, the radiation can take the form of x-rays. Essentially, the instabilities are created by the relative drift between the relativistic beam electrons and target plasma electrons. Although a large number of parameters influence this collective interaction, the dominant factors in determining the strength of the instabilities are (1) beam temperature along a streamline, and (2) the wavelength of the instabilities relative to the radial dimension of the target plasma.

In prior art experimentation, beam temperature along a streamline occurs primarily from the passage of the relativistic electrons of the beam through the foil dividing the low-density plasma and diode vacuum. The effect of the foil can be made negligible by (1) increasing the electron energy, (2) reducing the thickness of foil, or (3) reducing the effective Z of the foil material. As a result, a high-voltage, i.e., exceeding 3 MeV, electron beam can, in fact, penetrate a number of foils and still deposit its energy efficiently in the high-density plasma.

By utilizing plasmas of high-density, the wavelength of the instabilities are small compared to the radial dimensions of the plasma. Thus, although the instantaneous deposition rate can vary, the nonlinear evolution of the instability functions to relax the beam distribution in both angle and energy, resulting in an efficient coupling of beam energy to the plasma.

Figure 6:
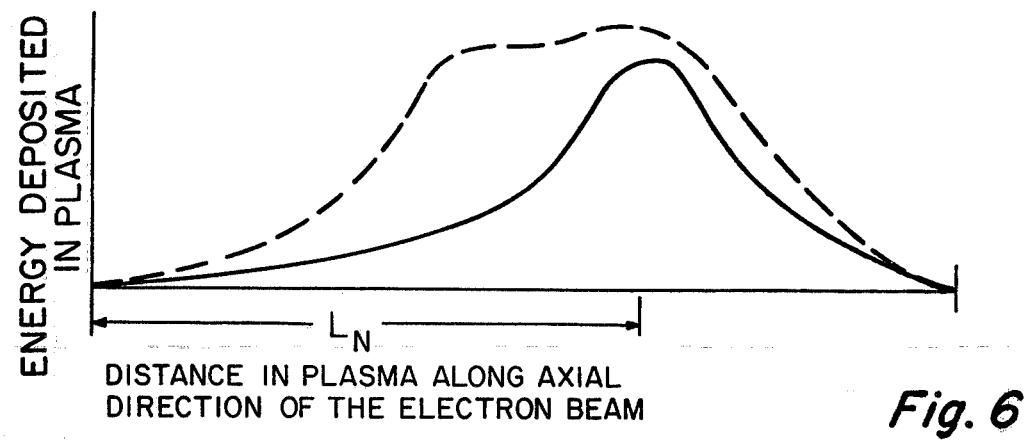
FIG. 6 is a graph illustrating the characteristic nonuniform energy deposition (ordinate) along the direction of beam propagation (axis) associated with the streaming instabilities of method (a). A one-dimensional interaction is represented by the solid line while the dashed line represents a two-dimensional interaction.

The characteristic nonuniform energy deposition of the collective interaction, i.e., two-stream and upper-hybrid instabilities along the direction of beam propagation, is illustrated in FIG. 6. A one-dimensional interaction is represented by the solid line while the dashed line represents a two-dimensional interaction. This nonuniform deposition property is utilized to concentrate energy deposited into the plasma from the relativistic electron beam, rather than allowing the energy to dissipate its explosive character by expansion into a large volume of plasma. The initial deposition of beam energy is into plasma electrons which, depending upon the parameters of the device, results, in (1) heat conduction which is used propitiously to obtain power multiplication, or in (2) current multiplication and confinement of the plasma. In this manner, the disadvantages of preferential heating of plasma electrons associated with magnetically confined plasmas is advantageously employed in the present invention.

Figure 7:
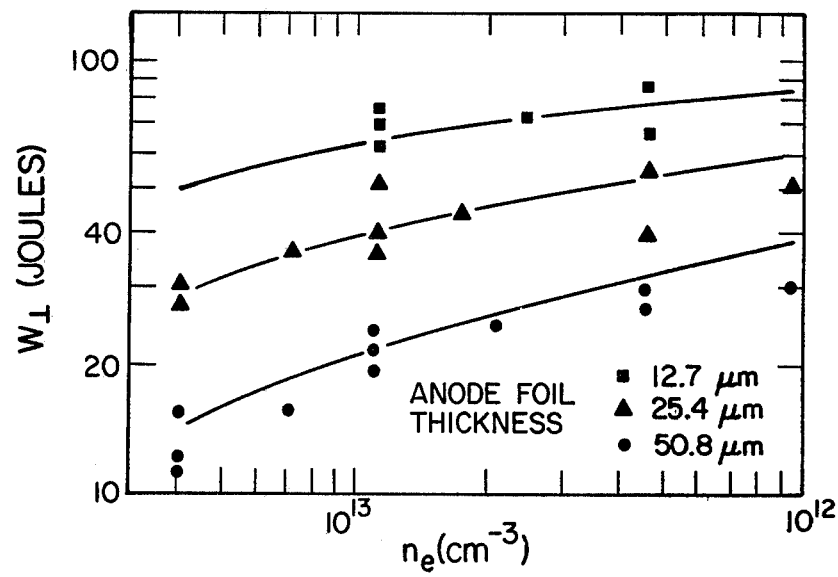
FIG. 7 is a graph of the experimental scaling of plasma heating in joules (ordinate) versus the plasma particle density $n_p$ in electrons/cm$^3$ for three different anode foil thicknesses. Theoretical predictions are indicated by solid curves.

The potential efficiency of relativistic beam energy deposition into a dense plasma via the streaming instability mechanism has hertofore been unknown in the prior art. FIG. 7 illustrates results of recent experiments performed according to the present invention in which energy deposition is plotted against plasma density for the application of a relativistic beam through anode foils having various thicknesses. As is apparent from the data of FIG. 7, a reduction in the anode foil thickness causes a great increase in deposition energy into the plasma. These results show that the basic coefficient of coupling $\alpha$ of the streaming instability deposition varies in the following manner:

$$\alpha = \chi S[1 - exp(-\chi S/F)]/(1+\chi S) \qquad (4)$$

where $S \equiv \beta^2 \gamma (n_b/2n_e)^{1/3}$ is the strength parameter, F is a function depending upon the foil thickness and material, $n_b$ is the beam density, $n_e$ is the plasma electron density, and $\chi = 1.0-1.3$ is a parameter associated with beam premodulation.

It is therefore apparent from efficiency equation (4) that if either the beam voltage ($\gamma$) is increased, or the foil function (F) reduced by decreasing the foil's effective Z or thickness, the factor $exp(-\chi S/F)$ approaches zero, such that the efficiency increases in direct proportion to $\chi S/(1+\chi S)$. Thus, the coupling efficiency is large for high-density plasma targets when high-voltage beams are utilized. Moreover, these coupling efficiencies can be obtained with little or no advancement in present relativistic electron beam technology since beams with voltage parameters sufficiently high to practice the present invention presently exist. As a result, currently available high-voltage relativistic electron beams are capable of achieving high energy deposition due to the ability of the high-voltage beams to penetrate the anode foil with reduced electron beam scattering. Thus, beams with $\nu/\gamma \lesssim 1$ achieve much higher coupling efficiencies via the streaming instabilities than beams with $\nu/\gamma \gg 1$ which are designed to optimize the resistive heating mechanism when using high-density plasma targets.

Figure 8:
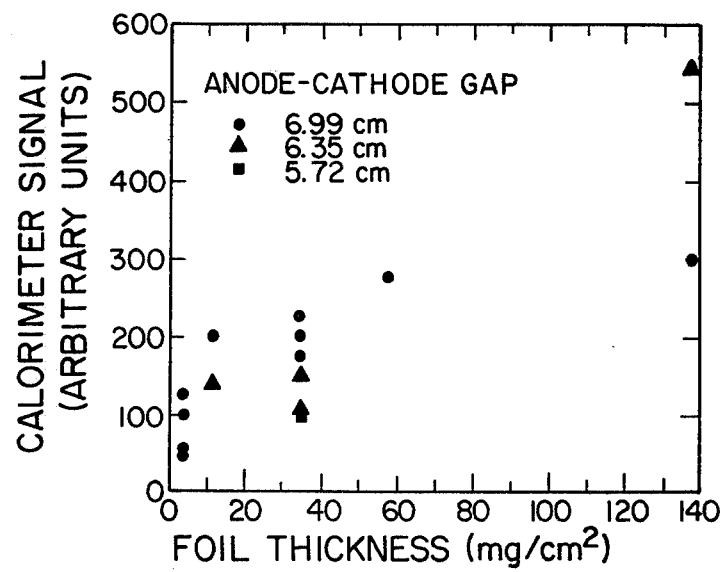
FIG. 8 is a graph illustrating experimental results of beam energy transmitted to a calorimeter (ordinate) versus anode foil thickness for three different anode-cathode gap spacings.

FIG. 8 illustrates results of an additional experiment showing propagation distance in a high-density plasma with various foil thicknesses and anode-cathode gap spacing. In this experiment a 7 MeV beam was injected into a 43 cm long, 0.4 torr $H_2$ gas target. No external magnetic field was present. The beam energy transmitted to a calorimeter located 43 cm from the anode foil was measured as a function of the anode-cathode gap spacing and anode foil thickness. Anode foils of 25.4 $\mu$m kapton and 25.4 $\mu$m, 76.2 $\mu$m, 127.0 $\mu$m, and 304.8 $\mu$m titanium were used. FIG. 8 shows a strong experimental dependence of the transmitted beam energy on the anode thickness and anode-cathode gap spacing. Ten centimeter long witness plates starting at the anode foil on the bottom of the gas container showed significant damage when the kapton foil was used, but showed little or no damage when the thicker titanium foils were used. The distortion of the anode foil was also found to depend dramatically upon foil thickness. Independent of foil thickness, the center region through which the beam passed was completely gone. However, the observed debris protruded in the direction of beam propagation for the thicker titanium foils, while the kapton foil showed debris protruding in the opposite direction. These results indicate formation of hot plasma in the vicinity of the thin foils and severe disruption of beam propagation as foil scattering is reduced due to a mechanism which depends upon microscopic properties of the beam distribution function. Furthermore, the distance over which such a disruption occurs is approximately 5 to 10 cm with the kapton foil, while the classical range for a 7 MeV electron in 0.4 torr $H_2$ gas is approximately $10^4$ meter. These observations, as well as the scaling with the anode-cathode gap, illustrate the effect of the streaming instability.

The basic dependence among the beam relativistic factor $\gamma=(1-\beta^2)^{-1/2}$, beam particle density $n_b$, and plasma electron particle density $n_e$, is given by the strength parameter $S=\beta^2\gamma\ (n_b/2n_e)^{1/3}$. The potentially large coupling efficiency associated with the relativistic streaming instabilities is a consequence of the relativistic dynamics, the strength of which depends upon S. Specifically, if an electron undergoes a change in velocity $\delta\beta=\delta v/c$, its change in energy is $\delta\gamma=\gamma^3\beta\delta\beta/(1+\gamma^2\beta\delta\beta)$. For the streaming instabilities, the characteristic change in velocity incurred during bunching is $\delta\beta\cong\gamma^{-1}\ (n_b/2n_e)^{1/3}\beta$. It follows that $$\delta\gamma/\gamma\cong S/(1+S), \quad (5)$$

which can be of order unity.

A more detailed one-dimensional analysis indicates that not all the beam electrons act coherently during the bunching process, since their individual responses vary with energy. Basically, this is due to phase mixing. Denoting $\alpha$ as the coupling coefficient, the one-dimensional analysis yields $$\alpha=1.5\ S/(1+1.5\ S)^{5/2}, \quad (6)$$

which maximizes at $S\cong0.45$ with $\alpha\cong0.19$. This rather high optimum efficiency for a one-dimensional analysis is still believed to be the maximum efficiency obtainable by the great majority of the plasma physics community. In reality, the assumption that the nonlinear state is one-dimensional as shown by the solid line in FIG. 6, is physically incorrect for an optimized interaction and more clearly resembles the dashed line of FIG. 6, which is the result of a two-dimensional analysis. Since the relativistic electron beam will relax strongly in both energy and angle, it is necessary to carry out a self-consistent, two-dimensional, fully relativistic nonlinear calculation to determine the coupling coefficient. Such calculations can only be carried out using advanced particle code techniques. Because such codes are expensive to run and cannot be employed for all physical parameter regimes of interest, an analytical procedure or model has been developed which determines the magnitude of various parameters for optimal interactions which is disclosed in Los Alamos Scientific Report LA-7215-MS (April 1978) by Lester E. Thode entitled "Preliminary Investigation of Anomalous Relativistic Electron Beam into a $10^{17}$ to $10^{20}$ cm$^{-3}$ Density Plasma" available at the Library of Congress. From this model and extensive numerical particle simulations, the phase mixing present in the one-dimensional analysis can be overcome by the angular relaxation of the beam, and an optimal coupling efficiency of $$\alpha_{optimal}\cong S/(1+S) \quad (7)$$

appears achievable.

The factors which influence the coupling coefficient include the following:

(1) beam relativistic factor,
(2) beam particle density,
(3) plasma particle density,
(4) beam temperature along a streamline,
(5) Larmor radius effects resulting from radially dependent ordered transverse motion,
(6) wavelength of instability relative to radial size of the beam and plasma,
(7) radial plasma gradients,
(8) externally applied magnetic field strength,
(9) plasma temperature,
(10) electron-ion and electron-neutral collision rate,
(11) ionization state of plasma and ionization gradients,
(12) plasma hydrodynamic gradients,
(13) beam pinching resulting from current multiplication,
(14) premodulation, and
(15) time dependence of the electron beam power.

It has been found that the electron random motion or temperature along a streamline and the wavelength of the instabilities relative to the radial size of the plasma primarily determines the ability of the interaction to sustain a high coupling efficiency over the entire beam pulse, as pointed out above.

Beam temperature along a streamline can result from the random motion associated with the temperature of the cathode surface. However, transverse temperatures of 300-1000 eV at the emission surface are required before this source of random motion begins to degrade the interaction. Due to the high-voltage applied to the cathode, electrons are field emitted with typical transverse energies of 1 to 20 eV. Thus, this source of random motion is negligible in the invention.

A possibly more serious source of random motion is electron emission from the cathode shank and lack of beam equilibrium at the emission surface. However, by shaping the cathode and anode surfaces properly, and by simultaneously applying an external magnetic field to the diode region, this source of random motion can also be reduced to a negligible level.

In fact, beam temperature along a streamline seems to result primarily from the passage of realtivistic electrons through thin foils. Extensive analysis has shown that the effect of such a foil on the interaction can be made negligible. The effect of a foil is to reduce the fraction of beam electrons $\Delta n/n_b$ which can act coherently during the development of the instability. This fraction is determined as follows:

$$\Delta n/n_b=1-exp(-\chi S/F). \quad (8)$$

Typical values for the foil scattering function (F) are given in the table of FIG. 9. It follows that increasing $\gamma$ and decreasing the foil's effective thickness results in the factor $exp(-\chi S/F)$ approaching zero. Thus, the beam can penetrate a closed container and retain a high coupling efficiency to the enclosed target plasma.

It has generally been argued that the transverse motion associated with the beam self-fields comprises an effective temperature. If no external magnetic field is present and the beam is injected into a plasma in order to obtain equilibrium, such ordered motion can evolve into random motion. However, for the optimized interaction, the coherence length of the beam is long relative to the deposition length. Thus, high-voltage, low $\nu/\gamma$ beams in a focused flow configuration can interact strongly with a plasma, provided the plasma begins at the anode foil and $\Delta n/n_b\cong1$.

If the target plasma is also high-density, the wavelength associated with the streaming instabilities is very short compared to the radial dimensions of the beam and plasma, Eq. (2). Under these conditions, the optimal nonlinear evolution of the instability is highly two-dimensional, and once initiated is extremely difficult to degrade. The formation of plasma hydrodynamic gradients and beam pinching due to current multiplication results in the instantaneous deposition rate varying in time. Such a time variation is not monotonic, however.

The distance over which the relativistic electron beam can deposit upwards of S/(1+S) of its kinetic energy is $$L_N \cong 10\gamma(n_e/n_b)^{1/3}c/\omega_p, \quad (9)$$

where $\omega_p$ is the target plasma frequency and c is the speed of light. This is order's-of-magnitude shorter than the classical range of megavolt electrons in a $10^{17}-10^{20}$ cm$^{-3}$ density plasma. For example, if $n_b(\gamma)$ is determined from one-dimensional, relativistic foil diode result, such as disclosed by H. R. Jory and A. W. Trivelpiece, J. Appl. Phys. 40, 3924 (1969), $$L_N \cong \Gamma(\gamma)(d^2/M)^{1/3} \text{ cm.} \quad (10)$$

Figure 10:
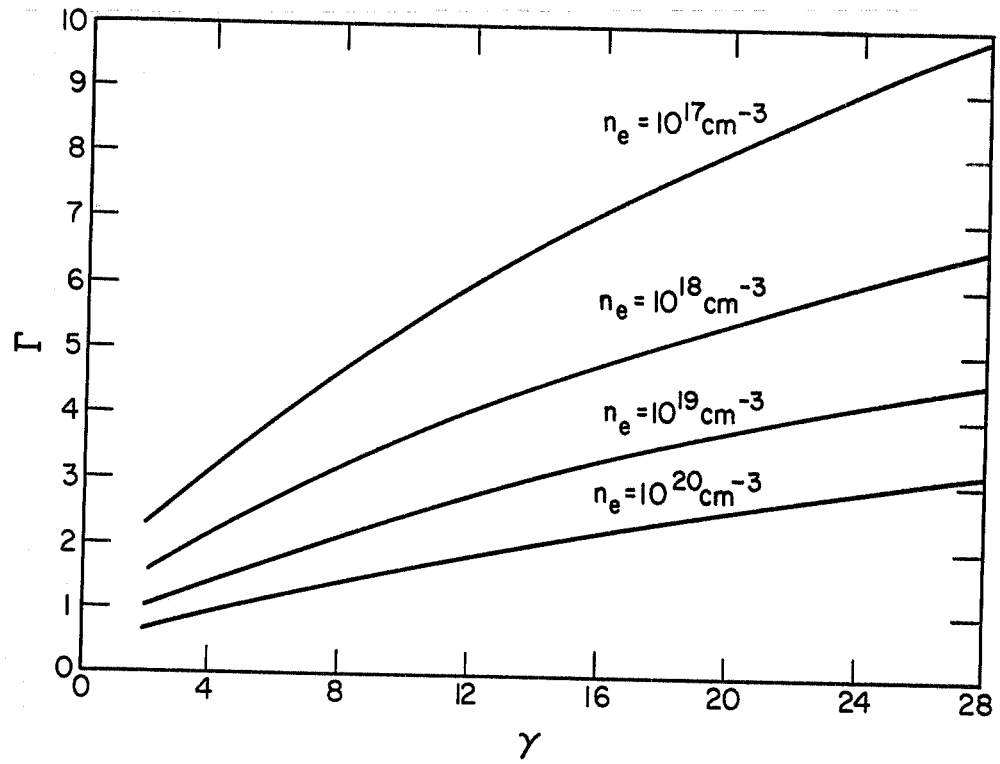
FIG. 10 is a graph of the dimensionless parameter $\Gamma$ (ordinate) versus the relativistic factor $\gamma$ (axis) for given values of plasma density in electrons/cm$^3$.

In Eq. (10) the diode gap spacing is d and the adiabatic compression ratio is M. The dimensionless parameter $\Gamma(\gamma)$ is shown for given values of the plasma electron density $n_e$ in FIG. 10. Because waves e-fold from noise, most of the beam energy is actually deposited over a length shorter than $L_N$ by a factor of 2 to 3. The characteristic nonuniform energy deposition of the collective mechanisms, two-stream and upper-hybrid instabilities, is shown in FIG. 6, for both the one- and two-dimensional interactions. According to the present invention, this nonuniform deposition property is utilized to concentrate energy deposited into the plasma from the relativistic electron beam, as opposed to prior art experimentation wherein energy is allowed to dissipate its explosive character by expansion into a much larger volume of plasma.

Two basic approaches for utilizing a relativistic electron beam driven, high-energy density plasma to produce radiation, neutrons, and/or alpha particles are possible.

Figure 11:
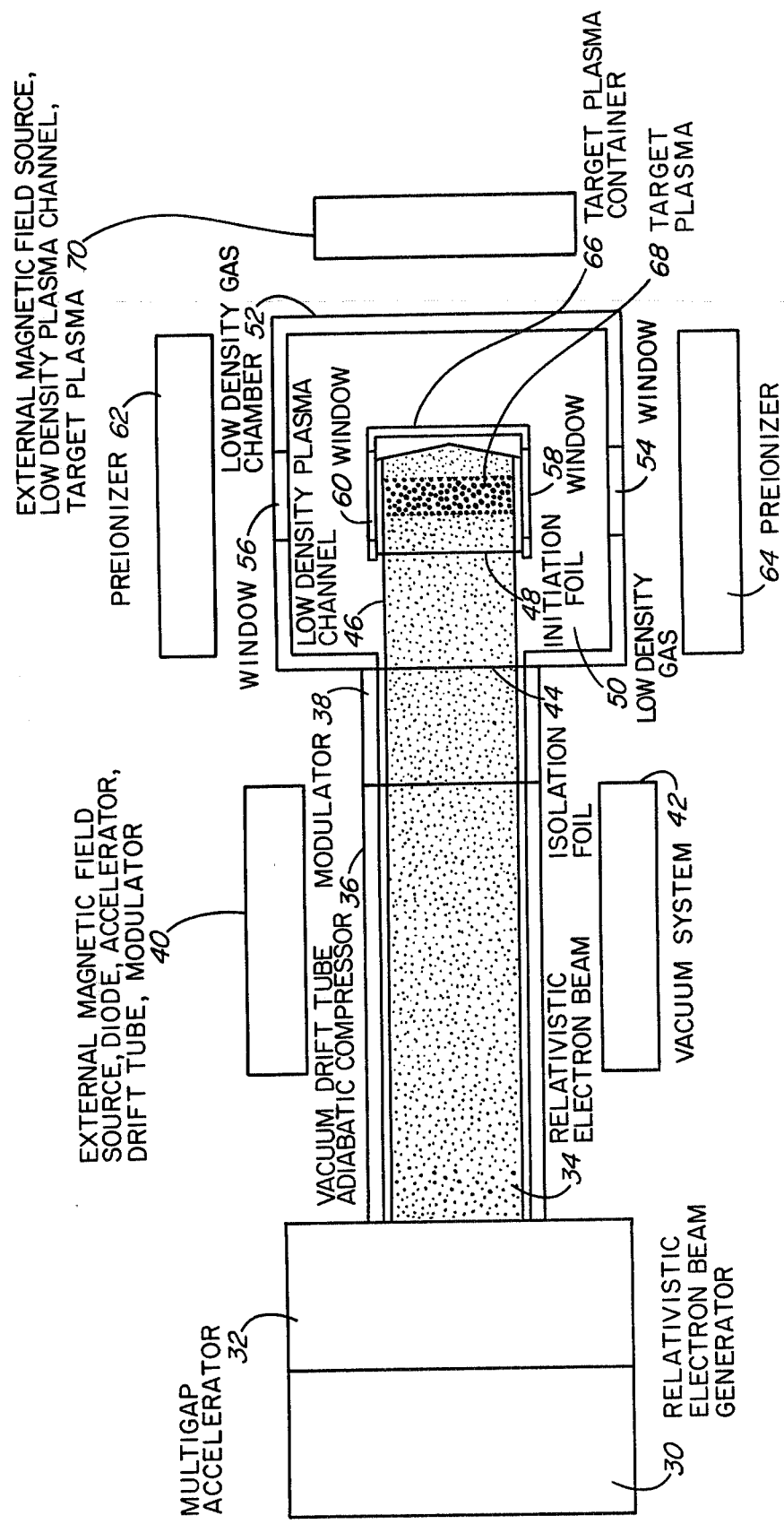
FIG. 11 is a schematic diagram illustrating the primary components of a system utilizing high-energy density plasma as a direct source of radiation.

The first approach is a direct use of the plasma as the source by confining its energy for a sufficient length of time as disclosed in copending application Ser. No. 882,024 entitled "Device and Method for Electron Beam Heating of a High Density Plasma" filed Feb. 28, 1978 by Lester E. Thode. According to this approach, a solid relativistic electron beam penetrates a 3 cm$^3$ to 50 cm$^3$ gas filled container, and transfers a fraction of its energy and momentum to the enclosed gas. Conservation of energy and momentum requires that the beam both heat the plasma and drive a large axial plasma current. The presence of the large axial current, in turn, initiates additional plasma ion heating and confinement. This configuration is similar to a dense Z-pinch. At high plasma density the option for predominantly heating electrons or heating both electrons and ions exists. This is possible because the classical equipartition time between the plasma species and the anomalous electron and ion heating rates can be varied significantly. FIG. 11 discloses a schematic diagram of the major components of a device which uses the high-energy density plasma as a source.

According to the second approach as disclosed in copending application Ser. No. 9,703 entitled "Device and Method for Relativistic Electron Beam Heating of a High-Density Plasma to Drive Fast Liners" filed Feb. 5, 1979 by Lester E. Thode and copending application Ser. No. 9,702 entitled "Device and Method for Imploding a Microsphere with a Fast Liner" filed Feb. 5, 1979 by Lester E. Thode, an annular relativistic electron beam is utilized to penetrate a 3 cm$^3$ to 50 cm$^3$ gas filled container, and to transfer a fraction of its energy and momentum to the enclosed gas. Again, conservation of energy and momentum causes the beam to both heat the plasma and drive a large axial plasma current. Since the heated plasma is annular, the large axial current leads to directed heat flow towards the interior of the annular region, where a fast liner is disposed which is engulfed and driven inwardly by hot electrons to implode on itself or to implode a structured microsphere. The fast liner functions as a power multiplier, which is cylindrical, spherical, or ellipsoidal in shape. By adjusting the electron heating rate and plasma density, the device can be driven by either ablation or exploding pusher. Also, control of the driving electron temperature and distribution is accomplished by varying the plasma density and magnitude of the external magnetic field. A conceptual diagram of the major components of a system to utilize a high-energy density plasma to drive power multiplication conversion devices is shown in FIG. 12.

Figure 39:
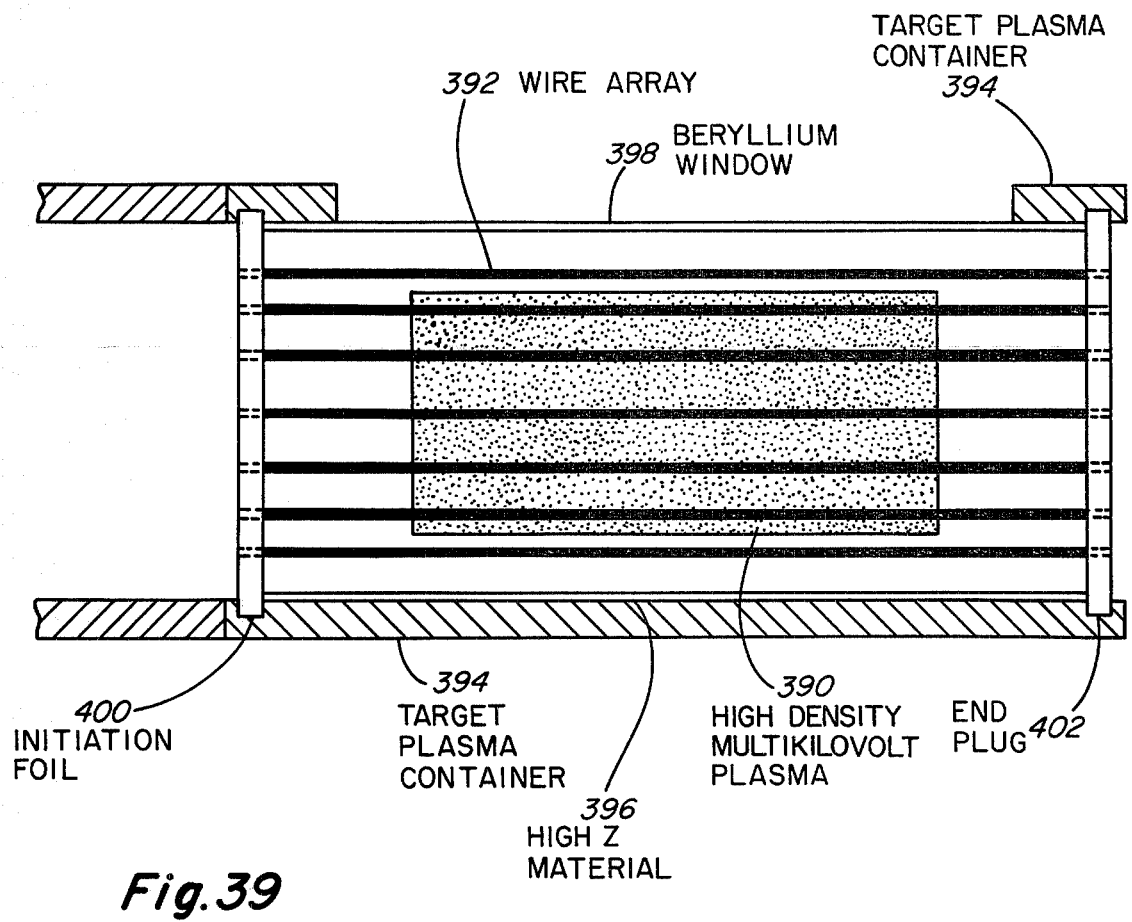
FIG. 39 is a schematic cross-sectional view of a wire array device for radiation generation.
Figure 40:
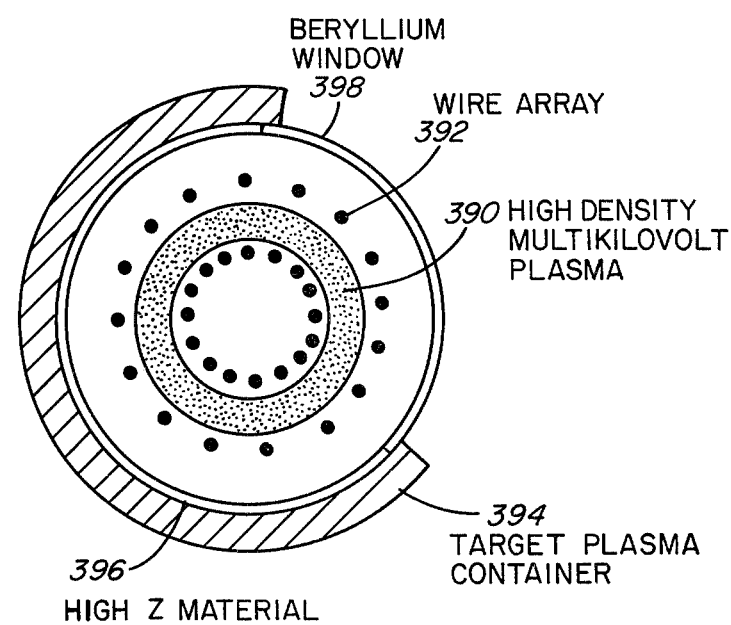
FIG. 40 is a schematic end view of a wire array device for radiation generation.

According to the approach of the present invention, radiation is produced in two ways. The first way involves heating either a high-density moderate Z plasma, or a high-density, high Z plasma mixed with a low Z plasma, by either a solid or annular relativistic electron beam. The second way comprises heating a high-density, low Z plasma as set forth above and using the heated plasma to heat a high Z material such as a wire array as illustrated in FIGS. 39 and 40. Although an annular beam is shown in FIGS. 39 and 40, a solid beam can also be used with the inner wire array eliminated.

Figure 12:
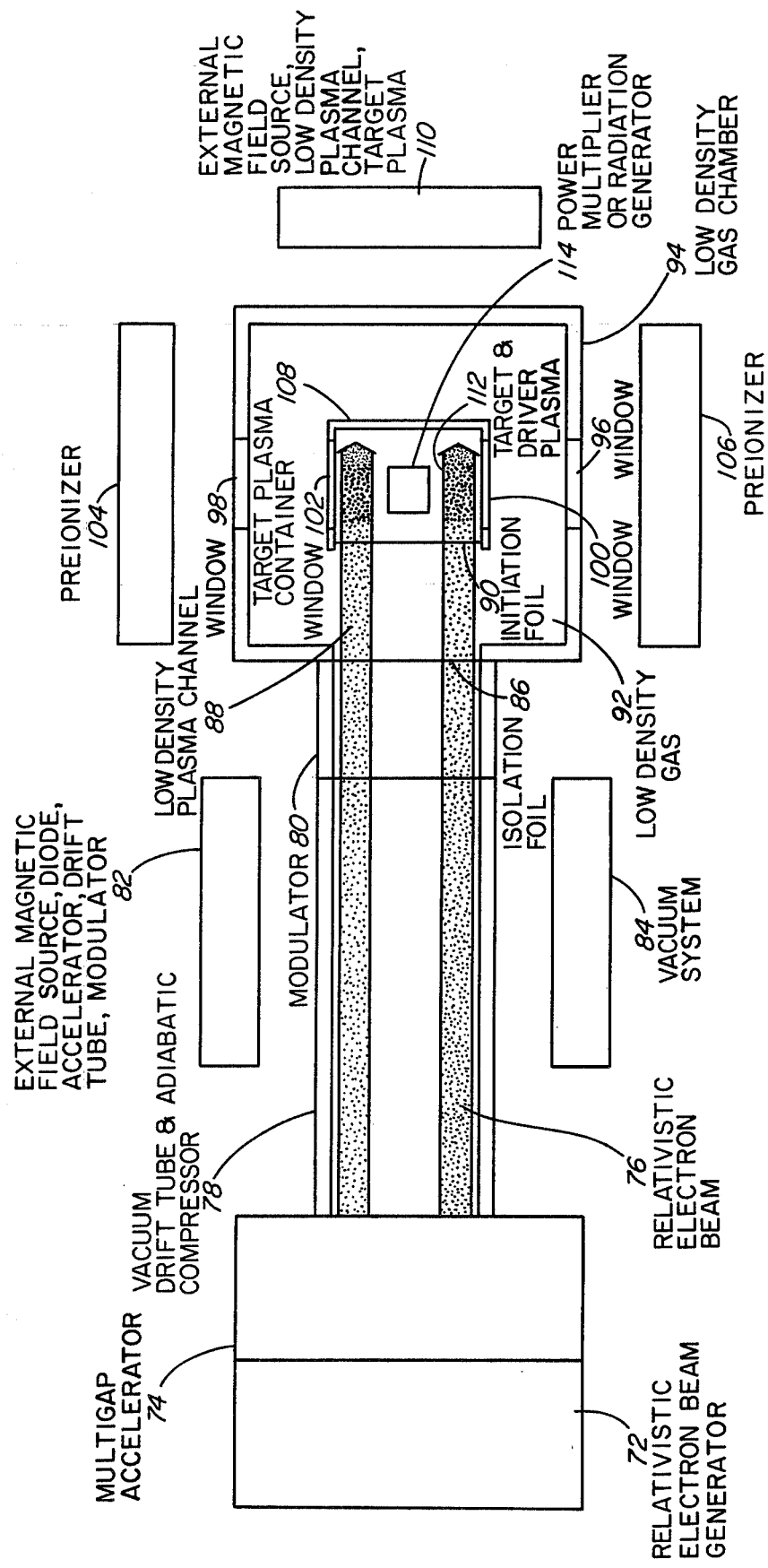
FIG. 12 is a schematic diagram illustrating the primary components of a system which utilizes a high-energy density plasma to produce radiation according to the peferred embodiment of the invention.
Figure 13:
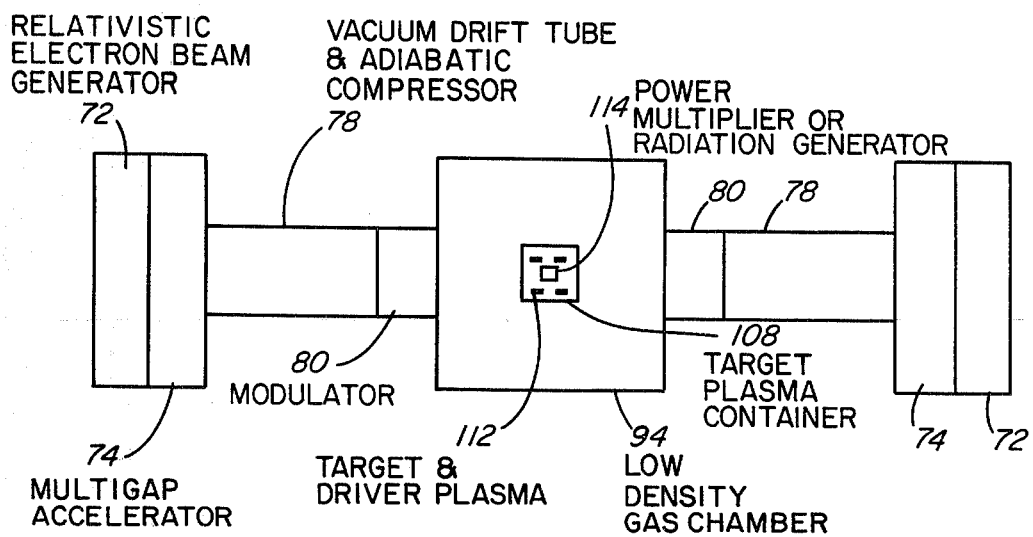
FIG. 13 is a schematic illustration of a two annular beam system providing cylindrical symmetry.
Figure 14:
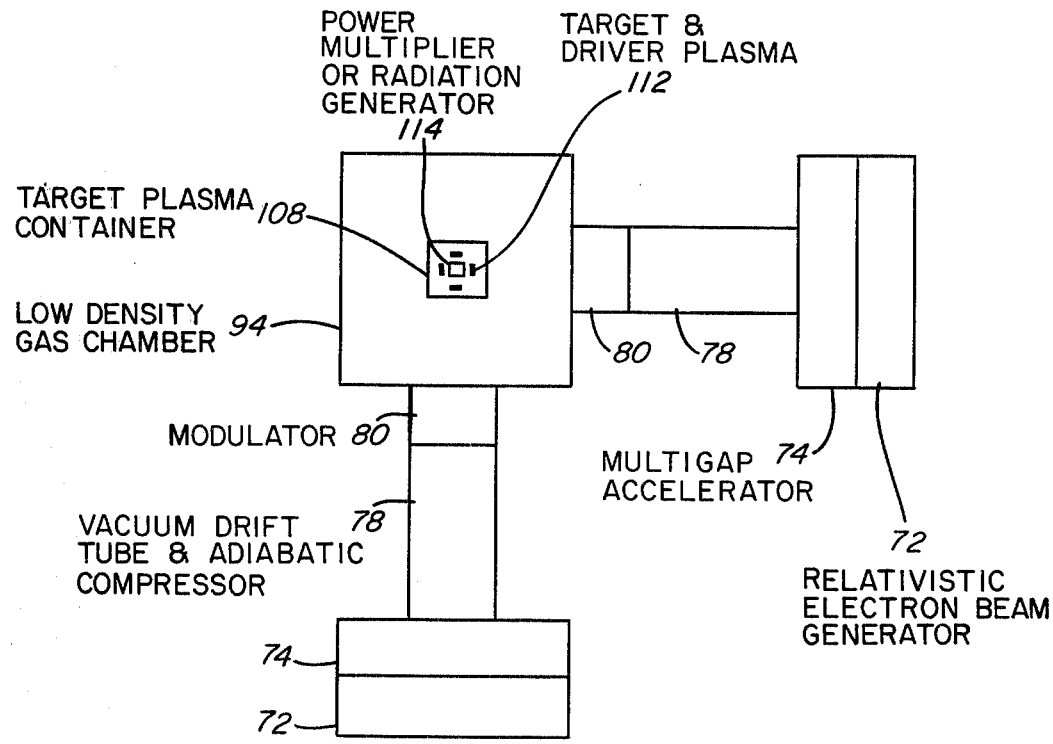
FIG. 14 is a schematic illustration of a two annular beam system providing spherical symmetry.
Figure 15:
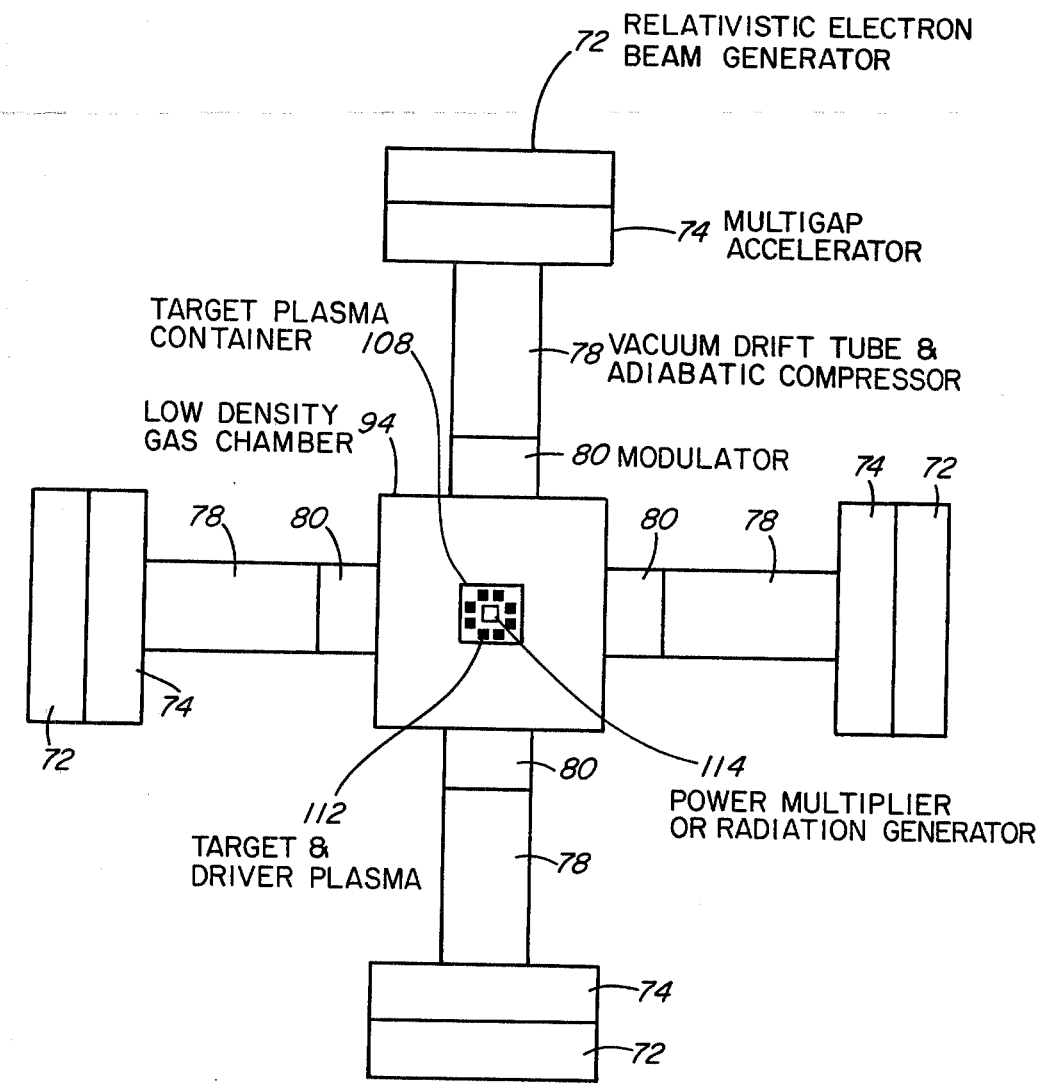
FIG. 15 is a schematic illustration of a four annular beam system which also provides spherical symmetry in a multimegajoule system.

Many modifications and variations of the configurations shown in FIGS. 11 and 12 are possible. For example, various applications of the concept do not require the use of a low-density gas chambers 52 and 94, modulators 38 and 80, drift tubes and adiabatic compressors 36 and 78, or multigap accelerators 32 and 74. With advances in relativistic electron beam technology, external magnetic field sources 70 and 110, preionizers 62 and 64, 104 and 106, and windows 54 to 60, and 96 to 102 can be eliminated. With annular beams, multiple beam systems are possible, as depicted in FIGS. 13 through 15. For multiple beam systems, the energy deposition regions do not overlap, allowing such systems to drive larger power multiplication devices.

Figure 16:
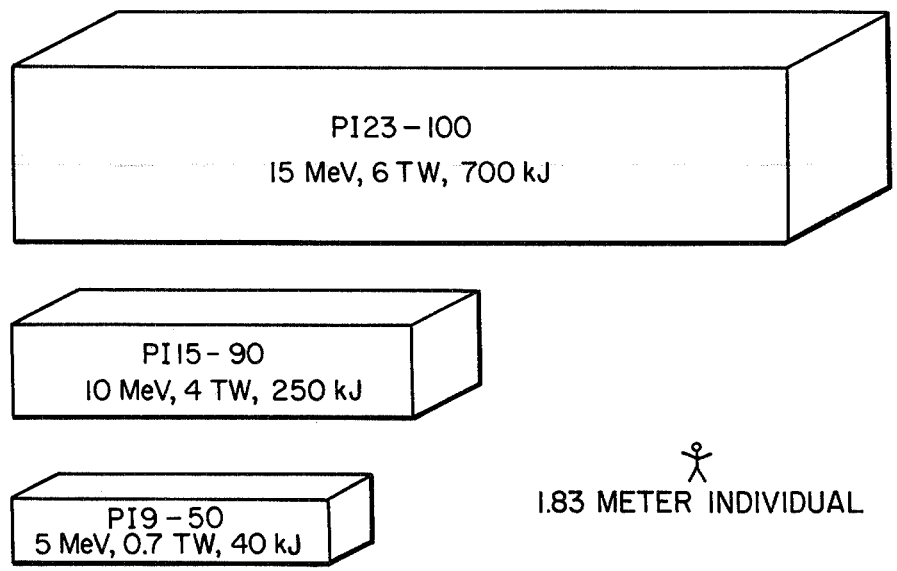
FIG. 16 is a schematic diagram illustrating the relative sizes of various relativistic electron beam generators relative to a 1.83 meter individual.
Figure 17:
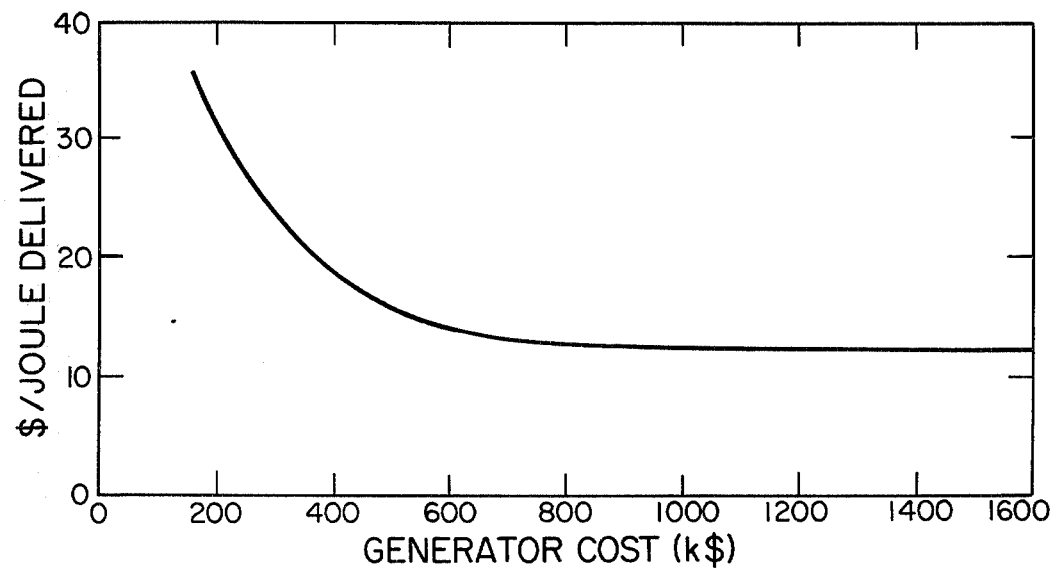
FIG. 17 is a graph illustrating the approximate cost per joule delivered (ordinate) as a function of total generator cost in thousands of dollars (axis).

To practice the present invention, a high-voltage, high-current density relativistic electron beam is required for the reasons set forth above. Presently, a number of high-impedance generators are in use, such as the PI23-100, PI15-90, PI14-80, and PI9-50 which are schematically illustrated in FIG. 16. Here, PI refers to the Physics International Company, the first number is the diameter of the Blumlein in feet, and the second number is the number of stages in the Marx generator. As shown in FIG. 16, the generators are relatively compact in size for the energy delivered. Also, the time to design and build such generators is relatively short. For example, the PI14-80 was recently designed and built in eight months. As shown in FIG. 17, the cost of the technology is relatively inexpensive. State of the art generators produce a 16 to 20 MeV, 400 to 800 kA electron beam with a pulse width of approximately 100 ns. The overall electrical efficiency for such a generator is approximately 40% to 45%. If the energy remaining in the Marx generator is recovered, the energy efficiency of such a generator is 80% to 90%.

Figure 18:
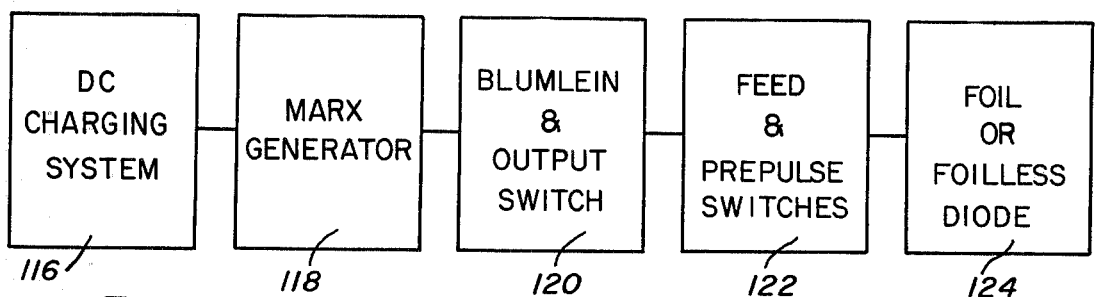
FIG. 18 is a schematic illustration of the basic components of a high-impedance relativistic electron beam generator.
Figure 19:
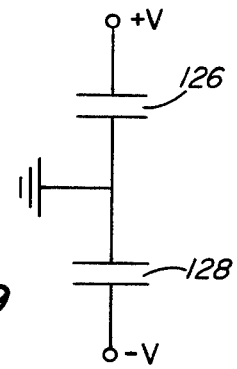
FIG. 19 is a schematic illustration of the electrical equivalent of a Marx stage.

As shown in FIG. 18, high-impedance generators are composed of five basic components. A dc charging system 116 is used to charge the Marx generator 118, which is the primary energy storage component. The Marx generator 118 consists of a large number of stages which are charged in parallel and discharged in series using spark gap switches. FIG. 19 schematically illustrates the electrical equivalent of a Marx stage which consists of two capacitances 126 and 128 connected in series with a center ground to allow positive and negative dc charging.

Figure 20:
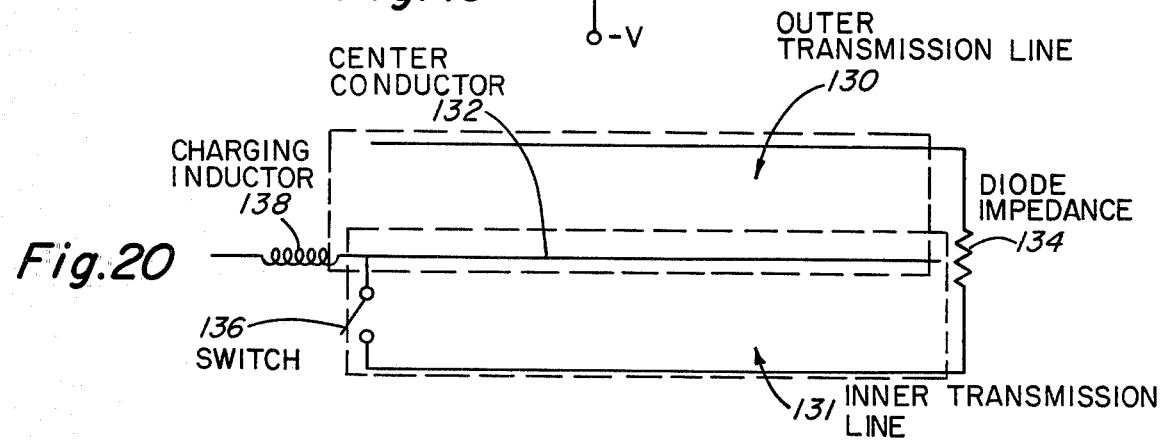
FIG. 20 is a schematic illustration of the electrical equivalent of a Blumlein and diode.

The Marx generator is then used to charge a Blumlein 120 such as schematically illustrated in FIG. 20. A Blumlein 120 is essentially two coaxial transmission lines 130 and 131 connected in series with the diode impedance 134 $Z_D$. Physically, the Blumlein appears as three concentric, annular conductors. This folded configuration is used to reduce the spatial dimension of the Blumlein. In operation, the center conductor 132 is charged through an inductor 138 having an inductance $L_c$ which appears as a short. Once charged, the switch 136 is closed and the transmission line 131 begins to discharge with a pulse propagating toward the diode 134. When the pulse hits the impedance discontinuity ($Z_D$) of diode 134, a voltage appears across the diode 134. As opposed to the shorted transmission line 131, which has an impedance $Z_I$, the transmission line 130 with impedance $Z_O$, is open. Thus, for a properly matched configuration ($Z_O = Z_I = Z_D/2$), a voltage equal to charge voltage on the inner conductor 132 appears across the diode 134 for a period twice the propagation time down any one of the transmission lines 130 or 131. The inductor 138 appears as an open circuit during the Blumlein discharge. For high voltages the Blumlein 120 uses transformer oil as a dielectric.

Due to the physical configuration of the Blumlein 120, it is difficult to design the transmission lines 130 and 131 such that $Z_I = Z_O$. As a result, there is typically a very small, but nonnegligible, voltage that appears across the diode 134 during the Blumlein charge, due to stray capacitances and inductances which is referred to as a prepulse. From the standpoint of proper operation of a high-current density diode, this prepulse must be suppressed. Significant progress in prepulse suppression has occurred in the past few years. Through the use of prepulse switches 122 combined with careful design of the feed and diode region, a prepulse of less than 50 kV has been demonstrated for a 9 MV Blumlein charge. With this advance in prepulse suppression, beam particle densities exceeding $10^{14}$ electrons/$cm^3$ have been obtained in a focused flow configuration. More recently, however, a technique utilizing water as a dielectric, rather than oil in a Blumlein configuration, has been developed by Maxwell Laboratories of San Diego, Calif., which reduces prepulse voltage to less than 1 kV for multi-megavolt beams. This very low prepulse voltage provided by the Maxwell Laboratories configuration appears to be the preferred method of operation.

The final component is the diode 124, which can be either foil or foilless. Foil diodes suffer rapid impedance collapse when the current density exceeds 20 kA/$cm^2$. The physics of this problem has not, however, been considered in a systematic fashion and current densities up to 100 kA/$cm^2$ should be obtainable with improved vacuum systems.

Foilless diodes are naturally suited for embodiment of the present invention illustrated in FIGS. 39 and 40 since annular beams are readily produced at high current densities. However, the operation and flow characteristics of such diodes could be significantly advanced. A detailed discussion of the potential of the foilless diode is disclosed in Los Alamos Scientific Report LA-7169-P by Lester E. Thode entitled "A Proposal for Study of Vacuum Adiabatic Compression of a Relativistic Electron Beam Generated by a Foilless Diode."

Figure 21:
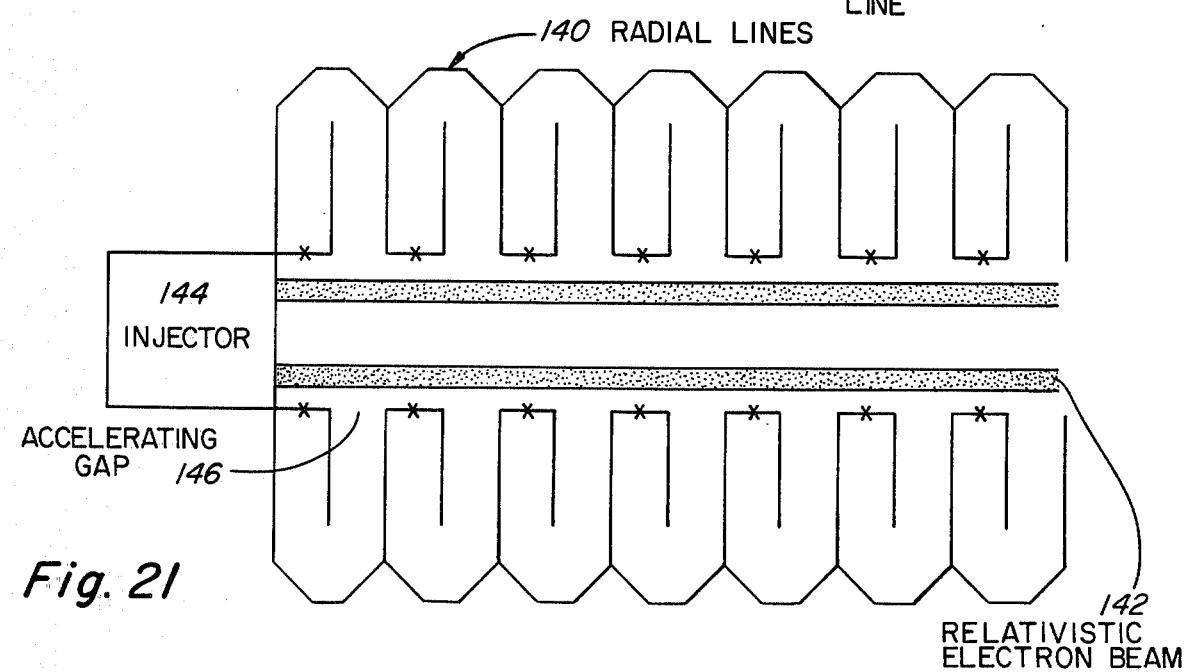
FIG. 21 is a schematic illustration of a multigap accelerator.

Pulsed high-current electron beams with particle energy exceeding 20 MeV can be produced with a multigap accelerator, as schematically illustrated in FIG. 21. The multigap accelerator is basically a linear accelerator with radial transmission lines or Blumleins providing energy to the accelerating gaps 146. Radial lines 140 are composed of coaxial disk or cone conductors which are stacked in series. As a result, the accelerator is amenable to mass production, probably at a cost of less than $5/joule delivered. In addition, the development time of a 200 to 800 kJ, 5 to 20 TW, 10 to 100 cycle per second prototype accelerator is less than five years. The injector 144 for such an accelerator can be the high-current electron beam generator disclosed infra, or the first accelerating stage of the accelerator. Fabrication of such accelerators is disclosed by A. I. Pavlovskii et al., Sov. Phys.—Dokl. 20, 441 (1975), in an article entitled "Multielement Accelerators Based on Radial Lines."

Referring again to FIGS. 11 and 12, the relativistic electron beams 34 and 76 propagate along the vacuum drift tube and adiabatic compressors 36 and 78 to the modulators 38 and 80. External solenoidal magnetic field sources 40 and 82 generate a magnetic field in the generator diode, accelerator, drift tube, and modulator regions to ensure a laminar flow beam equilibrium. In the vacuum drift tubes 36 and 78, the strength of the external magnetic field can be increased along the direction of beam propagation to produce adiabatic beam compression. Modest compression ratios can reduce the beam radius a factor of 2 to 3, while preserving a laminar flow equilibrium, provided the compression is carried out in vacuum. Vacuum systems 42 and 84 maintain the required vacuum.

Modulators 38 and 80 constitute an inner portion of the vacuum drift tubes 36 and 78 and are formed by a periodic structure or dielectric along the direction of beam propagation. Alternatively, a rippled magnetic field could be utilized to weakly bunch the beam. The purpose of modulators 38 and 80 is to provide an enhanced narrow band noise level (very weak modulation) at a wavelength and phase velocity slightly below the natural wavelength and phase velocity of the instability in the target plasma.

Figure 22:
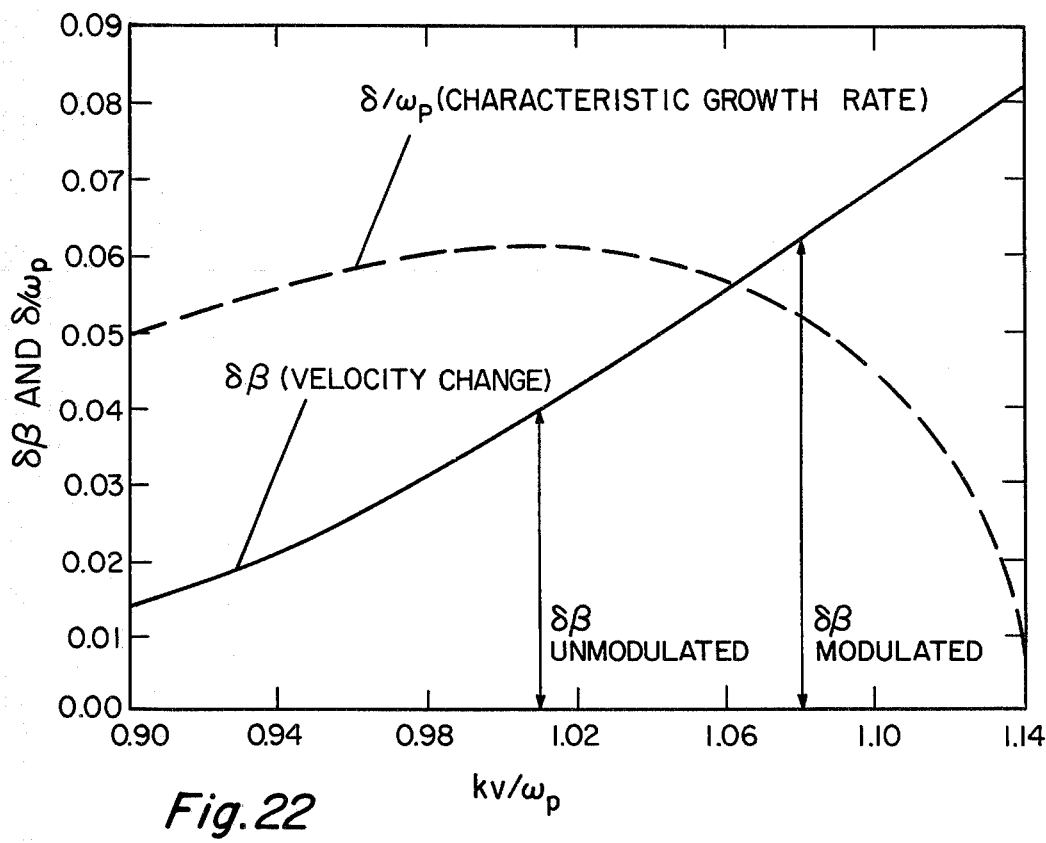
FIG. 22 is a graph of the characteristic growth rate and velocity change (ordinate) as a function of wave number for the streaming instabilities (axis).

The underlying idea behind this weak modulation is increased coupling efficiency. For waves propagating along the relativistic electron beam axis, the characteristic growth rate $\delta/\omega_p$ and characteristic change in beam velocity $\delta\beta = 2(\beta - \omega/kc)$ for the streaming instability as a function of the wave number $k = 2\pi/\lambda$ is shown in FIG. 22. Here $\omega/k$ is the phase velocity associated with the electrostatic spectrum, and v is the initial beam velocity. The growth rate is normalized to the plasma frequency $\omega_p$. For an unmodulated beam the nonlinear evolution of the streaming instability is determined by the fastest growing wave, which occurs at $kv/\omega_p = 1.1$ in this example. The beam energy loss is determined by $$\delta\gamma/\gamma \approx \gamma^2 \beta\delta\beta(\text{unmodulated})/[1+\gamma^2\beta\delta\beta(\text{unmodulated})] \approx S/(1+S) \quad (11)$$

as described previously.

By enhancing the noise level at a wavelength and phase velocity slightly shorter and slightly lower than the fastest growing wave, the beam energy loss is determined by $\delta\beta$(modulated) shown in FIG. 22. The coupling efficiency is then increased to $$\delta\gamma/\gamma \approx \gamma^2\beta\delta\beta(\text{modulated})/[1+\gamma^2\beta\delta\beta(\text{modulated})] \approx \chi S/(1+\chi S), \quad (12)$$

where $\chi \approx 1.0$ to 1.3 based upon analysis of the modulated interaction. Physically, the modulation leads to an enhanced strength parameter ($\chi S$). The modulation also reduces the effect of foil scattering and collisions on the interaction.

The low-density gas chambers 52 and 94 provide isolation between the replaceable target plasma containers 66 and 108 and modulators 38 and 80, drift tube and adiabatic compressors 36 and 78, accelerators 32 and 74, and generators 30 and 72 of figures 11 and 12, respectively. The electron density in the ionized low-density plasma channels 46 and 88 is typically close to the relativistic electron beam density, whereas in the target plasmas 68 and 112 the electron density is 4 to 6 orders of magnitude above the beam density. The low-density gases 50 and 92 comprise either $H_2$, He, Ar, $N_2$ or residual gas associated with the previous operation of the system.

Foils 44 and 86 provide isolation between the vacuum modulators 38 and 80 and the low-density plasma channels 46 and 88, and convert a small fraction of the rising beam impulse into Bremsstrahlung radiation which is directed predominantly along the direction of beam propagation. The isolation function is provided by a layer of metal (titanium, aluminum, or beryllium), graphite, or plastic, such as mylar ($C_{10} H_8 O_4$), kapton ($C_{22} H_{10} N_2 O_5$), or polycarbonate. A layer of plastic impregnated with high Z atoms, a fine mesh high Z wire screen with a very high optical transparency, or a high Z aperturing layer can be used to provide the Bremsstrahlung radiation. Bremsstrahlung radiation generated in this manner, aids in the creation of low-density plasma channels 46 and 88 for beam propagation through the low-density gases 50 and 92. With advances in relativistic electron beam technology, foils 44 and 86 can be eliminated in favor of strong differential pumping of the modulator regions 38 and 80.

Foils 48 and 90, provide isolation between the low-density plasma channel 46 and the dense target plasma and are constructed in a fashion similar to foils 44 and 86. Foils 48 and 90 also act to initiate the collective interaction and generate Bremsstrahlung radiation for partial ionization of the dense plasma target to assist or replace preionizers 62 and 64, 104 and 106.

In the ionized low-density plasma channels 46 and 88 and in the target plasma, the self fields of the beam are shorted out so that an external magnetic field is not required to achieve beam equilibrium. Thus, the beam can be ballistically guided through low-density plasma channels 46 and 88 to the plasma target. However, the overall efficiency of the system is enhanced by the presence of external magnetic field sources 70 and 110. Also, external magnetic field sources 70 and 110 provide increased stabilization of the relativistic electron beam within low-density plasma channels 46 and 88, respectively.

Preionizers 62 and 64, 104 and 106 provide full ionization of target plasmas 68 and 112, respectively. Any number of devices for creating a fully-ionized gas, such as discharge tubes, channel forming wires, various lasers including electron beam driven free electron lasers, plasma guns, microwave generators, or low-energy particle beams, can be used. The laser, however, is the best device for creating a low-temperature, fully-ionized plasma in the $10^{17}$ to $10^{20}$ electrons/cm$^3$ density region.

With a laser preionizer, windows 54 to 60 and 96 to 102, formed from sapphire, salt, or other appropriate materials, are positioned in the low-density gas chambers 52 and 94 and target plasma containers 66 and 108, respectively. For a fully-ionized target density of $8 \times 10^{18}$ to $10^{20}$ electrons/cm$^3$, a 0.1 $\mu$s to 2.0 $\mu$s, 0.2 kJ to 10 kJ HF laser, or a number of smaller HF lasers, can be used as preionizers 62 and 64, 104 and 106. A 0.1 $\mu$s to 2.0 $\mu$s, 0.2 kJ to 3 kJ $CO_2$ laser, or a number of smaller $CO_2$ lasers, are appropriate for fully ionizing gases with densities less than $8 \times 10^{18}$ electrons/cm$^3$.

The combination of Bremsstrahlung radiation produced at foils 48 and 90, direct impact ionization by the beam, avalanche, and the initial collective interaction is capable of fully ionizing the target plasma. However, the beam requirements are more stringent when the relativistic beam provides both ionization and heating of the target plasma. Use of preionizers 62 and 64, 104 and 106, therefore lowers the relativistic electron beam technology requirements.

The anomalous pinch, as disclosed in the above referenced copending application Ser. No. 882,024 filed Feb. 28, 1978 and illustrated in FIG. 11, is the simplest mode of operation. The relativistic electron beam target is a simple gas-filled container of DT, DD or HB. As a neutron source, the anomalous pinch intrinsically requires a very high-density plasma of at least $10^{19}$ electrons/cm$^3$.

As an alternative approach to a pulsed neutron source, the anomalous pinch can be operated as a target for an intense deuterium beam generated by the rapidly developing pulse power light-ion beam technology. Operating with a plasma density of approximately $10^{18}$ electrons/cm$^3$, the plasma electron temperature can be elevated sufficiently to reduce the cross section for deuterium beam energy absorption by target plasma electrons. Thus, the probability of survival of trapped energetic deuterium ions to undergo fusion with the plasma deuterium and tritium ions is significantly enhanced. Although this two component concept is old, intense neutron pulses can be produced using present pulse power technology.

The device of FIG. 11 operates by applying the relativistic electron beam 34 to low-density gas chamber 52 such that beam 34 penetrates foil 48 with negligible scattering and initiates convective wave growth such that the waves e-fold until saturated through nonlinear trapping of the beam electrons. Since the nonlinear waves are not normal plasma modes, they are absorbed into the plasma very rapidly through nonlinear mode beating. Actually, this nonlinear mode beating acts throughout the entire interaction and keeps the level of electric field energy relatively low compared with the energy transferred from the beam to the plasma. The presence of the foil 48 thus ensures that the beam energy is deposited at a specified location within the target plasma container 66, as opposed to moving upstream.

Since energy and momentum are being transferred from relativistic electrons 34 to nonrelativistic electrons within the target plasma 68, the beam both heats and drives an axial current in the target plasma. The presence of the axial current, in turn, initiates plasma energy confinement through the generation of an azimuthal magnetic field similar to a Z pinch. Taking into account increased internal pressure resulting from the nonohmic process, an equilibrium pinch configuration is formed with currents in the multi-megampere range, with significant reduction in heat conduction losses. Relative to the typical classical Z-pinch, the generation of the anomalous pinch is considerably faster.

Figure 23:
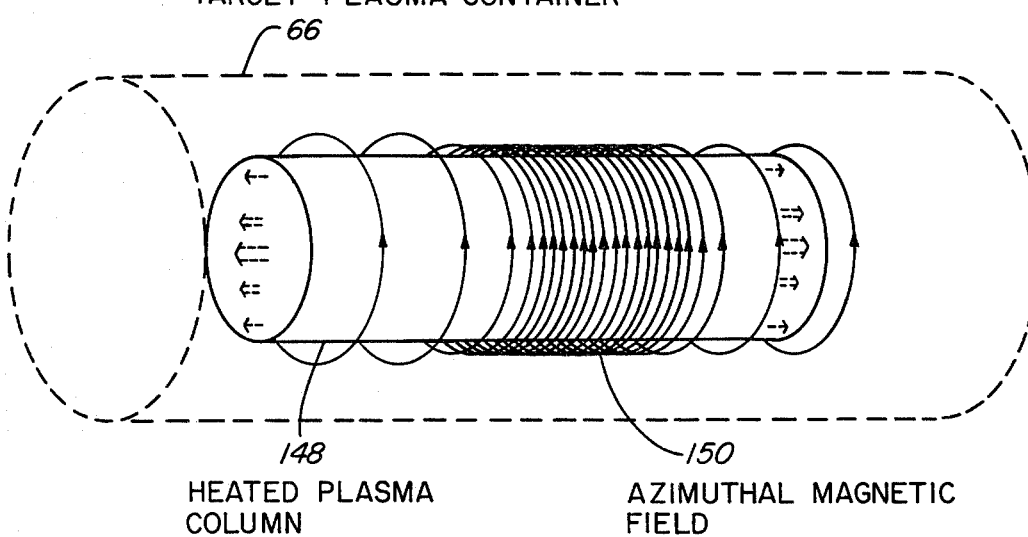
FIG. 23 is a schematic illustration of an anomalous pinch.

For a solid relativistic electron beam schematically illustrated in FIG. 11, the anomalously generated azimuthal magnetic field 150 and heated plasma column 148 is illustrated in FIG. 23. The axial nonuniformity in the azimuthal magnetic field strength of azimuthal magnetic field 150 is similar to the energy deposition illustrated in FIG. 6. Primary energy loss from the anomalous pinch is indicated by arrows. The presence of an external axial magnetic field and proximity of the radial wall, together provide stable operation.

Figure 24:
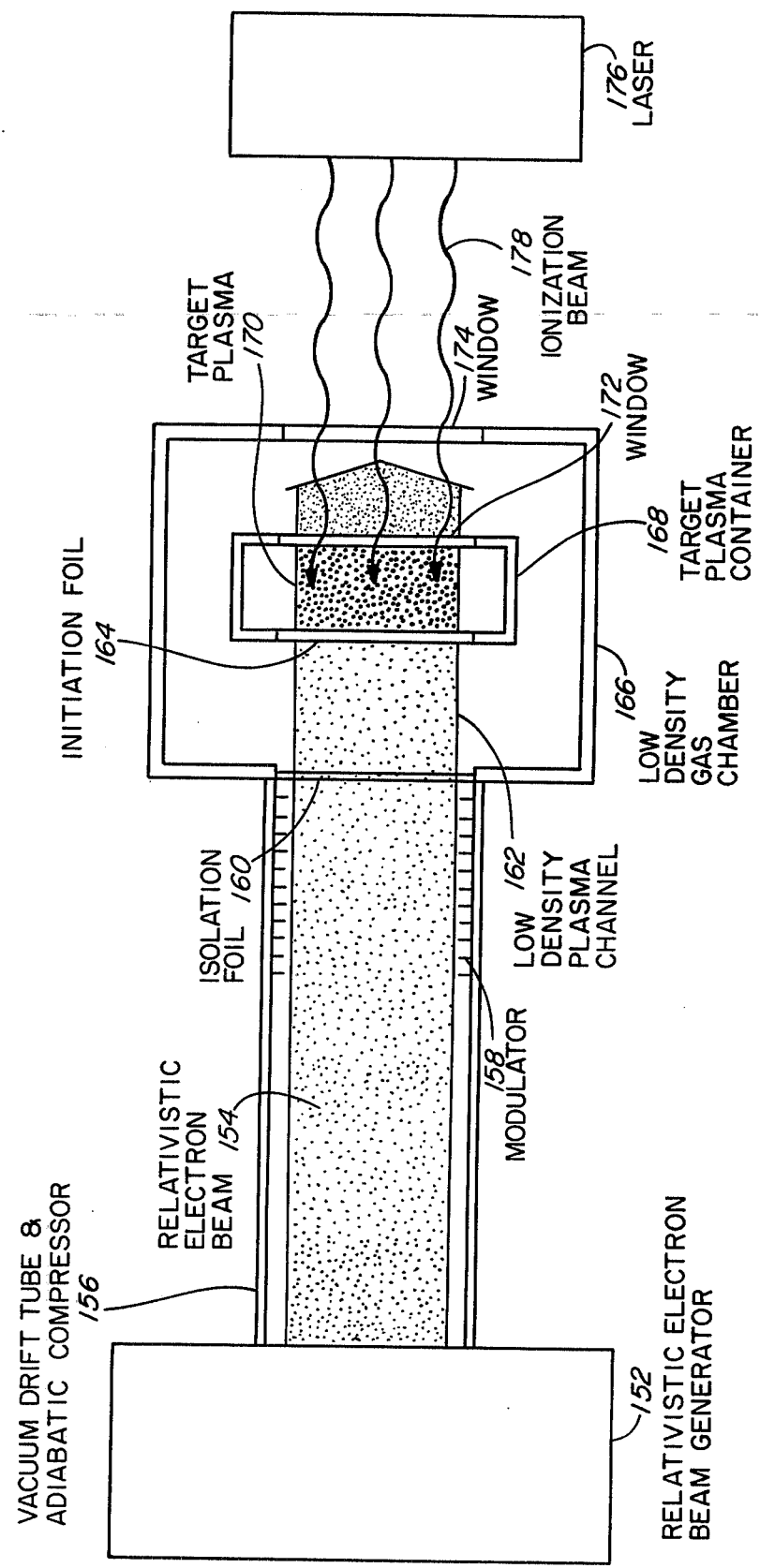
FIG. 24 is a schematic illustration of a device for producing an anomalous pinch utilizing a single laser preionizer.

FIG. 24 is a schematic illustration of the arrangement schematically disclosed in FIG. 11 and disclosed in the above referenced copending application Ser. No. 882,024 filed Feb. 28, 1978 for producing an anomalous pinch. As shown, relativistic electron beam generator 152 produces a solid relativistic beam 154 which propagates through the vacuum tube and adiabatic compressor 156 and adjacent modulator 158. The relativistic electron beam 154 then penetrates foil 160, passes through the low-density plasma channel 162, penetrates foil 164, and anomalously transfers a fraction of its energy and momentum to the target plasma 170 to generate the anomalous pinch illustrated in FIG. 23. Windows 172 and 174 allow the laser ionization beam 178 to penetrate the target plasma container 168 and low-density gas chamber 166. A salt or sapphire window is used for $CO_2$ or HF lasers, respectively. An ionization beam intensity of $10^9$ to $10^{10}$ watts/cm$^2$ is sufficient to fully ionize the plasma.

A fully-ionized plasma with sufficient axial uniformity can be formed using the configuration shown in FIG. 24. The laser energy is transferred to the target plasma through inverse Bremsstrahlung. Consequently, the target plasma exhibits a slightly decreasing gradient along the direction of propagation of the relativistic electron beam 154. Such a decreasing gradient tends to increase the strength of the deposition, since its effect on the nonlinear dynamics is similar to premodulation. In fact, the ability of the streaming instabilities to counteract self-consistent plasma hydrodynamic gradients is related to this dynamic effect.

Figure 25:
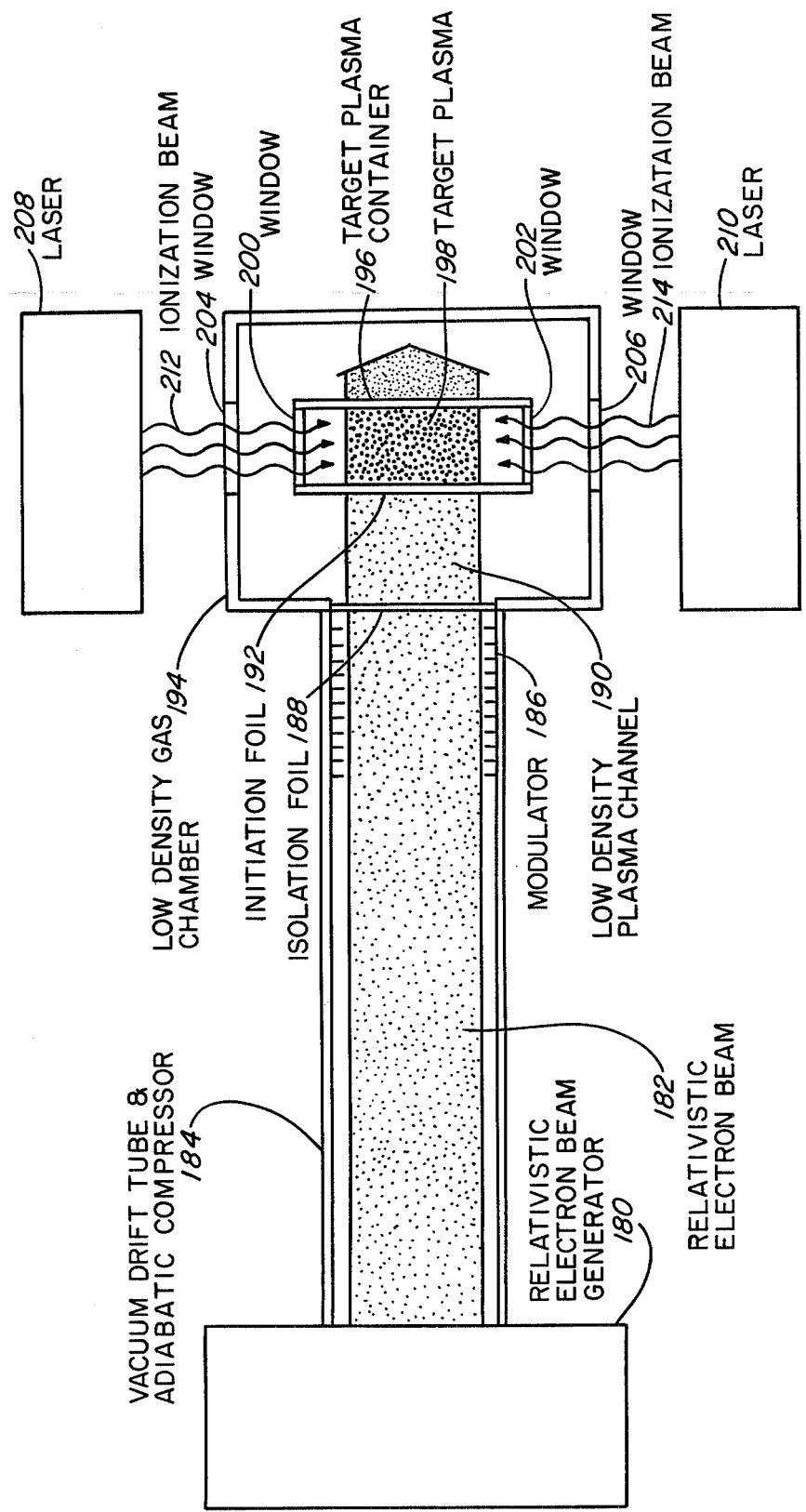
FIG. 25 is a schematic illustration of a device for producing an anomalous pinch utilizing two laser preionizers.

FIG. 25 is an alternative arrangement in which two lasers 208 and 210 apply ionization beams 212 and 214 transverse to the axis of the relativistic electron beam 182. Windows 204 and 206 in the low-density gas chamber 194 and windows 200 and 202 in the target plasma container 196 allow passage of the ionization beams to the target plasma 198.

Figure 26:
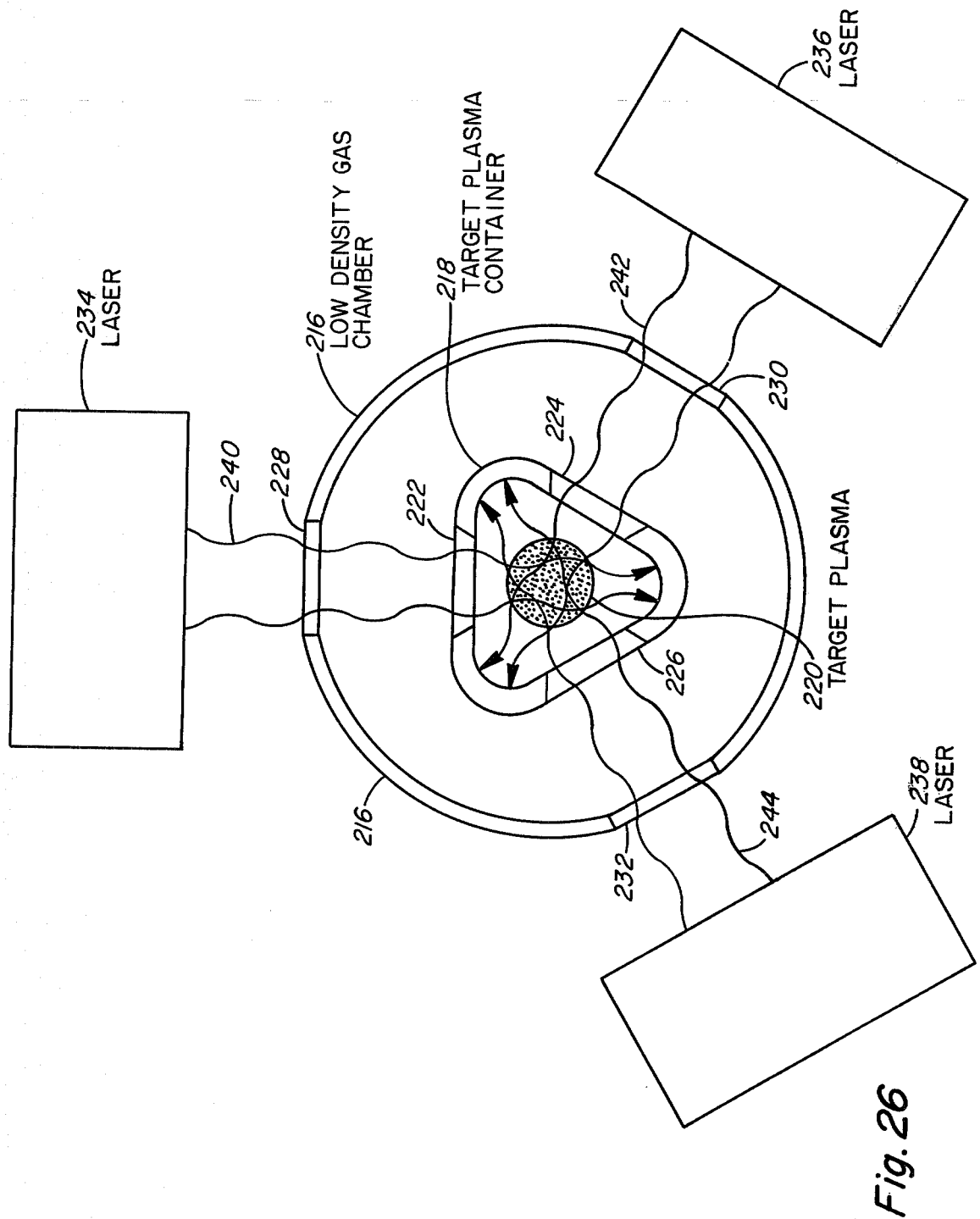
FIG. 26 is a schematic illustration of the end view of a device for producing an anomalous pinch utilizing three laser preionizers.

FIG. 26 is a schematic end view of an additional alternative arrangement utilizing three lasers 234, 236, and 238 which produce ionization beams 240, 242 and 244. Windows 228, 230 and 232 in the low-density gas chamber 216 and windows 222, 224 and 226 in the target plasma container 218 provide ionization beams 240, 242 and 244 access to the target plasma 220. The advantage of the arrangement shown in FIG. 26 is that lasers 234, 236 and 238 are arranged in an off-axis position such that laser beams 240, 242 and 244 are not directed at other lasers.

Although the single laser beam configuration shown in FIG. 24 produces the desired target plasma, additional magnetic field energy is required to deflect the residual relativistic electron beam so that the electron beam does not impinge upon laser 176. Also, the cost and technology associated with a single large laser is greater than with a number of smaller lasers with the same combined energy. Thus, the multiple laser configurations shown in FIGS. 25 and 26 are considered the preferred method of operation.

The preceding laser configurations are also appropriate for systems which use the high-energy density plasma to drive a fast liner to convergence or to implode a structured microsphere as disclosed in the above referenced copending applications Ser. No. 9,703 filed Feb. 5, 1979 and Ser. No. 9,702 filed Feb. 5, 1979, and schematically shown in FIG. 12. Since the laser intensity is quite low, the hot electron spectrum generated by such a beam interacting directly with a power multiplication device is negligible. The components of FIG. 11 and their operation are identical to the components of FIG. 12 with the exception of the target plasma container 66 and relativistic electron beam 34. Similarly, the deposition of electron beam energy in the target plasma 112 occurs in the same manner described with respect to FIGS. 5, 6, 11 and 22 to 26. Therefore, the remaining disclosure of FIGS. 27 through 38 relates only to the manner in which a hot annular plasma 112 drives a fast liner to convergence or to implode a structured microsphere.

Historically, high explosives or magnetically driven thin, cylindrical metallic shells have been referred to as liners. These hybrid devices incorporate concepts common to both magnetic and inertial confinement of plasma. Liners have been used to compress magnetic fields, compress and heat magnetically confined plasmas, and generate radiation. This type of power multiplication device can be generalized to include spherical and ellipsoidal shapes. Since the liners and multilayer in design, they are much like laser fusion pellets.

Figure 27:
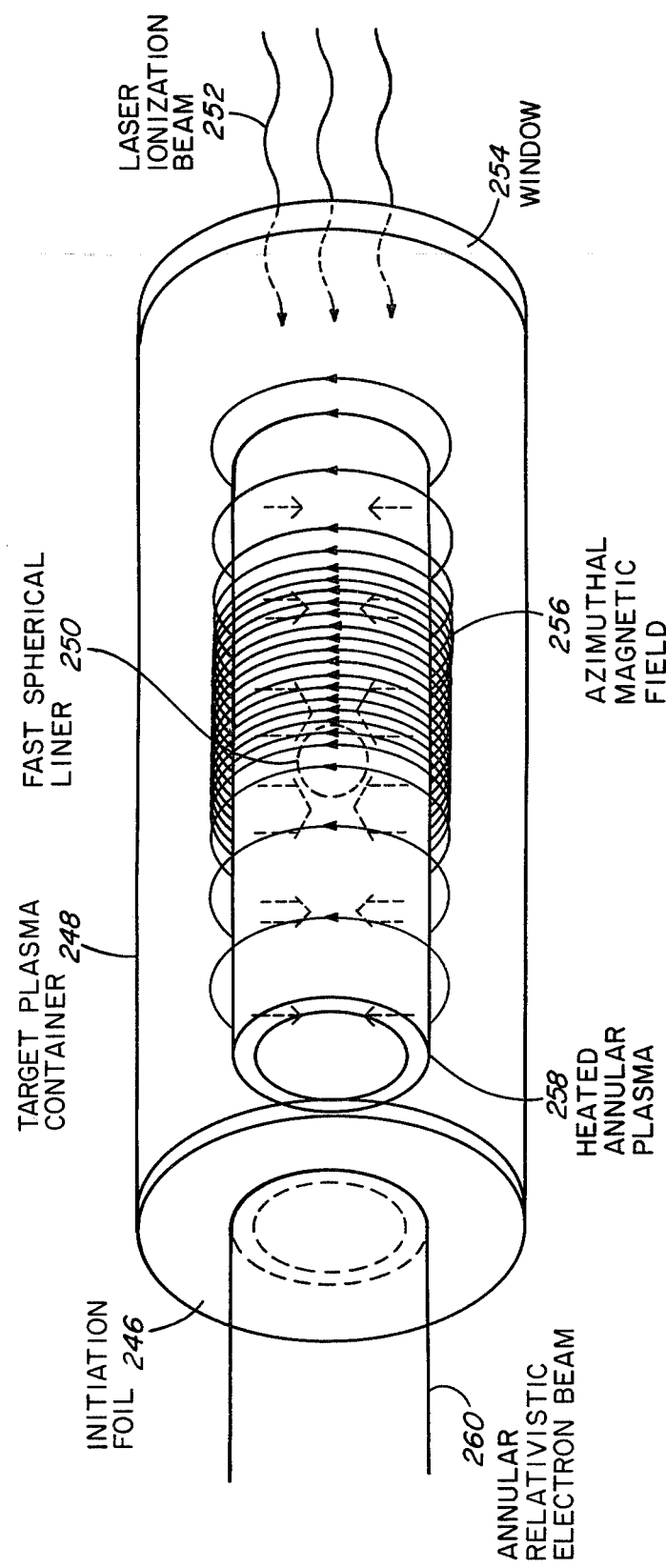
FIG. 27 is a schematic illustration of the basic geometry of a device for driving a fast sperical liner with an annular relativistic beam.
Figure 28:
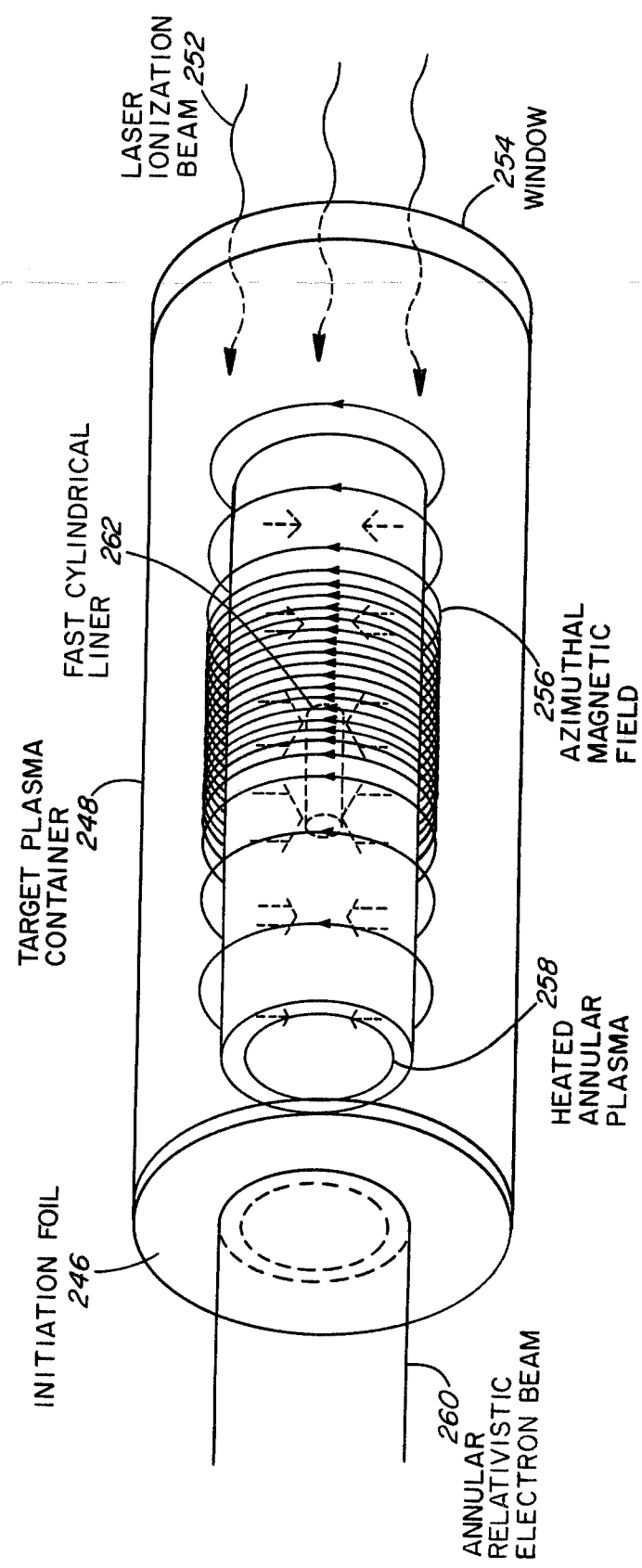
FIG. 28 is a schematic illustration of the basic geometry for driving a fast cylindrical liner with an annular relativistic electron beam.

A configuration suitable for driving fast spherical or cylindrical liners such as disclosed in copending application Ser. No. 9,703 filed Feb. 5, 1979 is shown in FIGS. 27 and 28, respectively. Here, a single laser ionization beam 252 entering through window 254 is used. Multiple laser ionization configurations, as shown in FIGS. 25 and 26, may be employed to obtain full ionization. The use of lasers for preionization lowers the relativistic electron beam technology requirements as disclosed above. Thus, the laser ionization sources should be considered as optional.

Referring again to FIGS. 27 and 28, an annular relativistic electron beam 260 which corresponds to beam 76 produced by the device of FIG. 12, penetrates the initiation foil 246, which also acts as an end plug to contain the low-temperature plasma or gas. As the voltage and current density rise, the anomalous coupling coefficient increases to its optimal value, and the beam transfers a large fraction of its energy and momentum to the annular plasma region 258. The beam driven azimuthal magnetic field 256, in turn, directs the annular plasma thermal energy to the fast spherical liner 250 or fast cylindrical liner 262. Since the source of the azimuthal magnetic field 256 is the result of an axial current flow in the annular plasma 258, magnetic field 256 is not present in the vicinity of the fast spherical liner 250 or fast cylindrical liner 262. The presence of an axial external magnetic field generated by external magnetic field source 110 shown in FIG. 12, can be used to increase the anomalous coupling coefficient. However, since the annular plasma column 258 is very high beta, the external magnetic field produced by source 110 is excluded during operation.

The radial wall of the plasma target container 248 is sufficiently thick to ensure magnetic flux containment and sufficiently massive to provide radial inertial confinement (tamper) on the relativistic electron beam time scale, i.e. $\lesssim 100$ ns. Thus, radial energy loss to the container wall is limited by both the azimuthal magnetic field 256 and excluded external magnetic field produced by source 110. Heat conduction is limited axially on the beam time scale by the lower axial temperature gradient, azimuthal magnetic field 256, and self-mirroring of the external magnetic field 110. Thus, the geometry takes advantage of anomalous coupling and classical heat conduction to rapidly and efficiently remove energy from the relativistic electron beam 260 and transport it to the fast liner.

Figure 29:
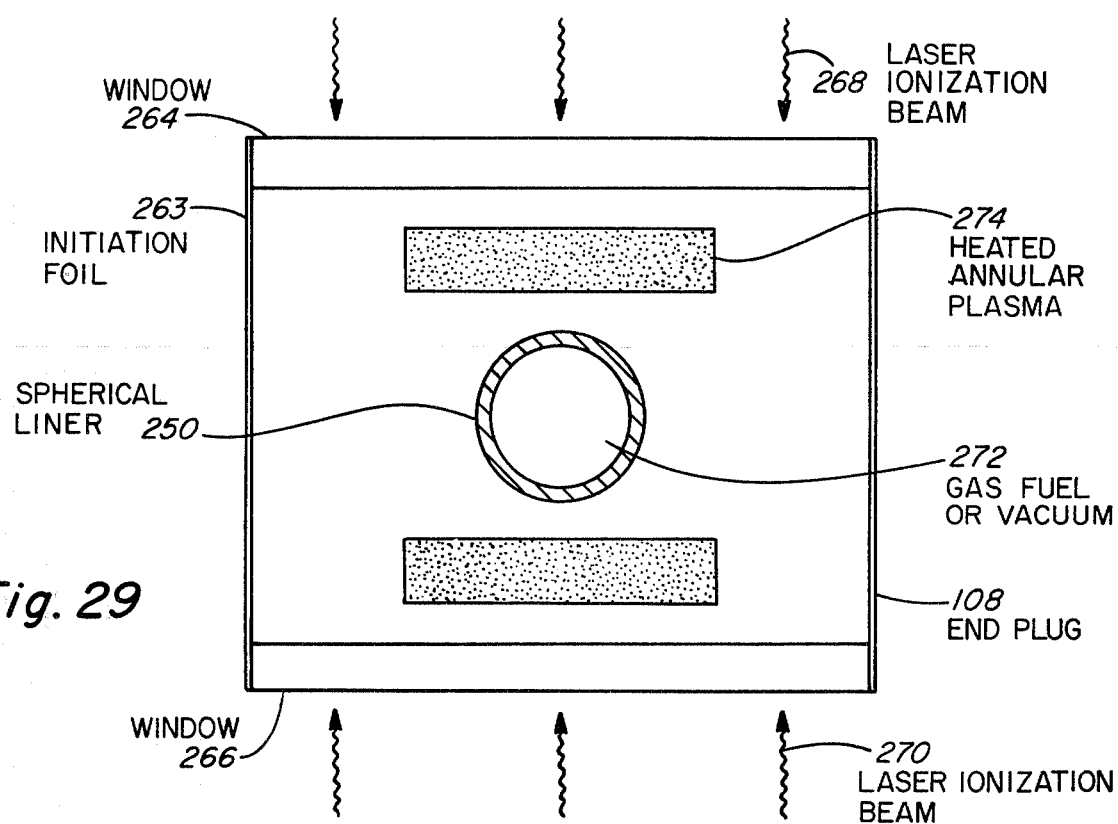
FIG. 29 is a schematic cross-sectional view of a spherical liner configuration with dual ionization beams.
Figure 30:
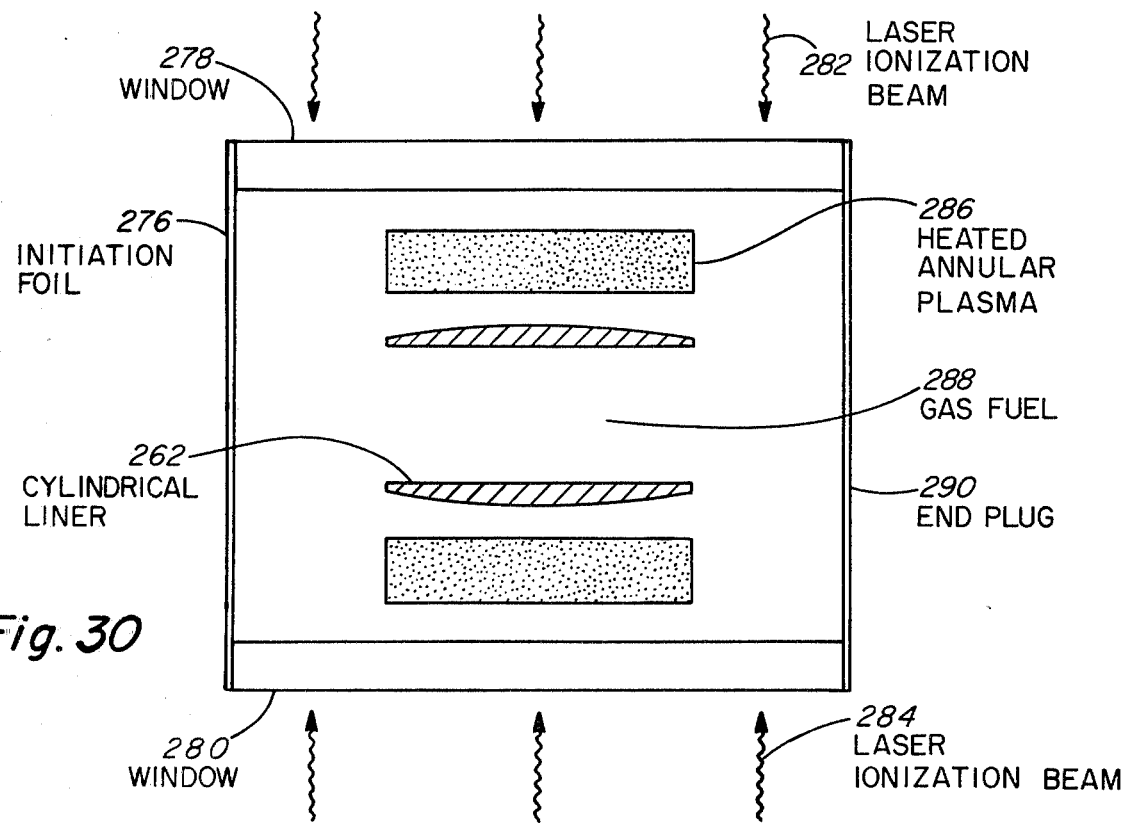
FIG. 30 is a schematic illustration of a cross-sectional view of a cylindrical liner configuration with dual ionization beams.

A cross-sectional view of the basic configuration with dual laser ionization beams 268 and 270, 282 and 284 for driving fast liners as disclosed in the above referenced copending application Ser. No. 9,703 filed Feb. 5, 1979, is shown in FIGS. 29 and 30, respectively. In this configuration, windows 264 and 266, 278 and 280 are placed in the radial wall of the plasma container. The heated annular plasmas 274 and 286 drive the spherical and cylindrical fast liner to implosion by explosive or ablative means as disclosed previously.

Figure 31:
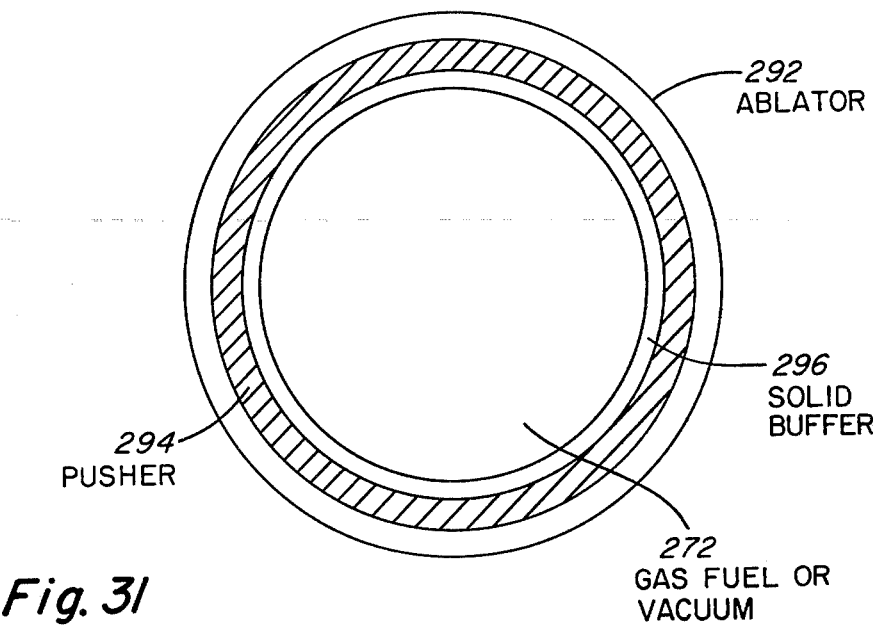
FIG. 31 is a schematic illustration of a cross-sectional view of a fast spherical liner.
Figure 32:
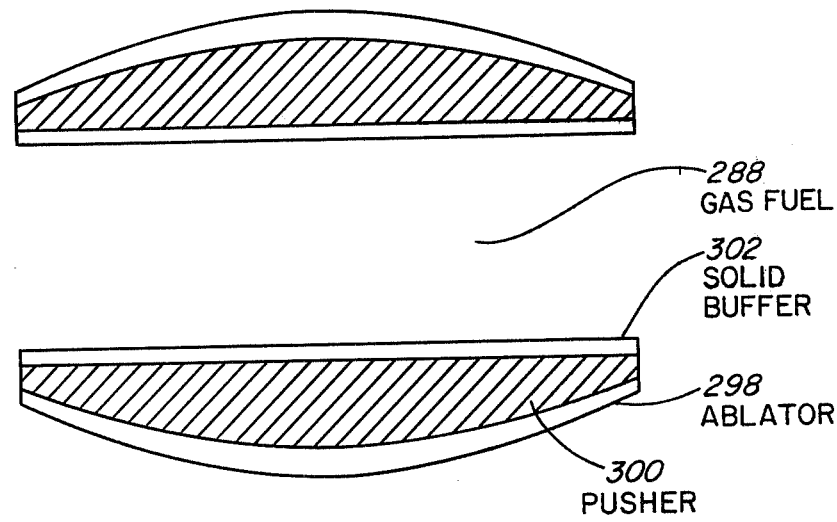
FIG. 32 is a schematic illustration of a cross-sectional view of a fast cylindrical liner.

Detail of the fast spherical liner 250 and fast cylindrical liner 262 as disclosed in the above referenced application Ser. No. 9,703, filed Feb. 5, 1979, is shown in FIGS. 31 and 32, respectively. Each of the fast liners consists of ablators 292 and 298, pushers 294 and 300 and solid buffers 296 and 302. The ablator is boiled off through heat conduction, to propel the pusher and solid buffer to high-implosion velocity. Since the thermal conductivity of a plasma is a strong function of temperature, the rate at which energy is transported to the liner increases in time throughout the beam pulse. Thus, some natural shaping of the plasma driving source is obtained. Such shaping leads to stronger compression and heating of the gas fuel 272 and 288, as disclosed by R. J. Mason et al., Phys. Fluids 18, 814 (1975) and S. D. Bertke et al., Nucl. Fusion 18, 509 (1978).

Structured spherical pellets similar to the liner 250 have been studied extensively with respect to laser implosion. The ablators 292 are 298 of both the spherical and cylindrical liners are a low Z, low mass density material such as LiDT, Be, $ND_3BT_3$, boron hydride, or CDT. Pushers 294 and 300 are typically a higher Z and mass density material such as glass, aluminum, gold, or nickel. Plastic embedded with high Z atoms is also used. Solid DT or LiDT can be used for the solid buffers 296 and 302. Depending upon the desired implosion velocity and various stability considerations, the total mass of fast liner 250 and 262 varies from 1 to 100 milligrams.

In the case of the cylindrical liner 262, shaping minimizes loss of the enclosed fuel 288 out the ends, as shown in FIG. 32. Alternatively, the ends can be plugged if the annular plasma 286 and fuel 288 are different. For example, gas fuel 272 and 288 may comprise DT, DD, $DHe^3$, $HLi^6$, or $HB^{11}$ whereas target plasma 274 and 286 may comprise $H_2$, He, DT, DD, or other low Z gas. An ellipsoidal shaped liner can also be used.

Figure 33:
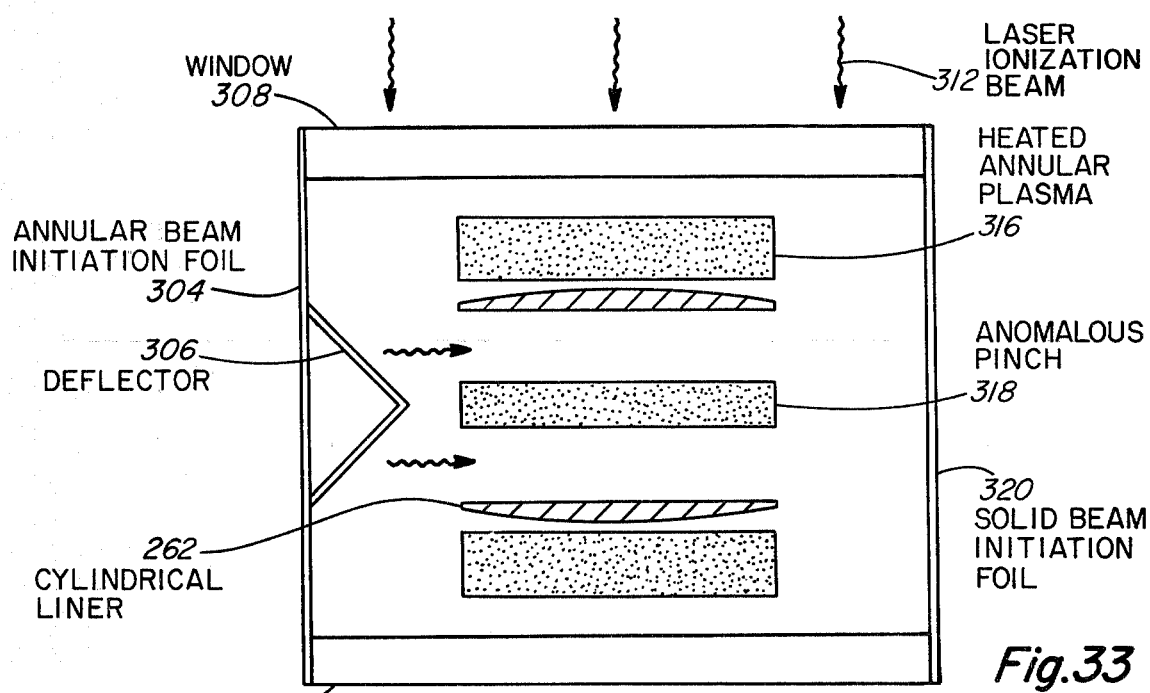
FIG. 33 is a schematic illustration of a cross-sectional view of an alternative fast liner device.

FIG. 33 illustrates another embodiment utilizing a fast liner. According to FIG. 33, a solid beam penetrates foil 320 to form an anomalous pinch 318 within the cylindrical liner 262, which is, in turn, driven by an annular beam entering through foil 304. Deflector 306 provides initial ionization in the anomalous pinch region 318. The cylindrical liner 262 implodes upon the plasma 318 to enhance compression and burn.

Figure 34:
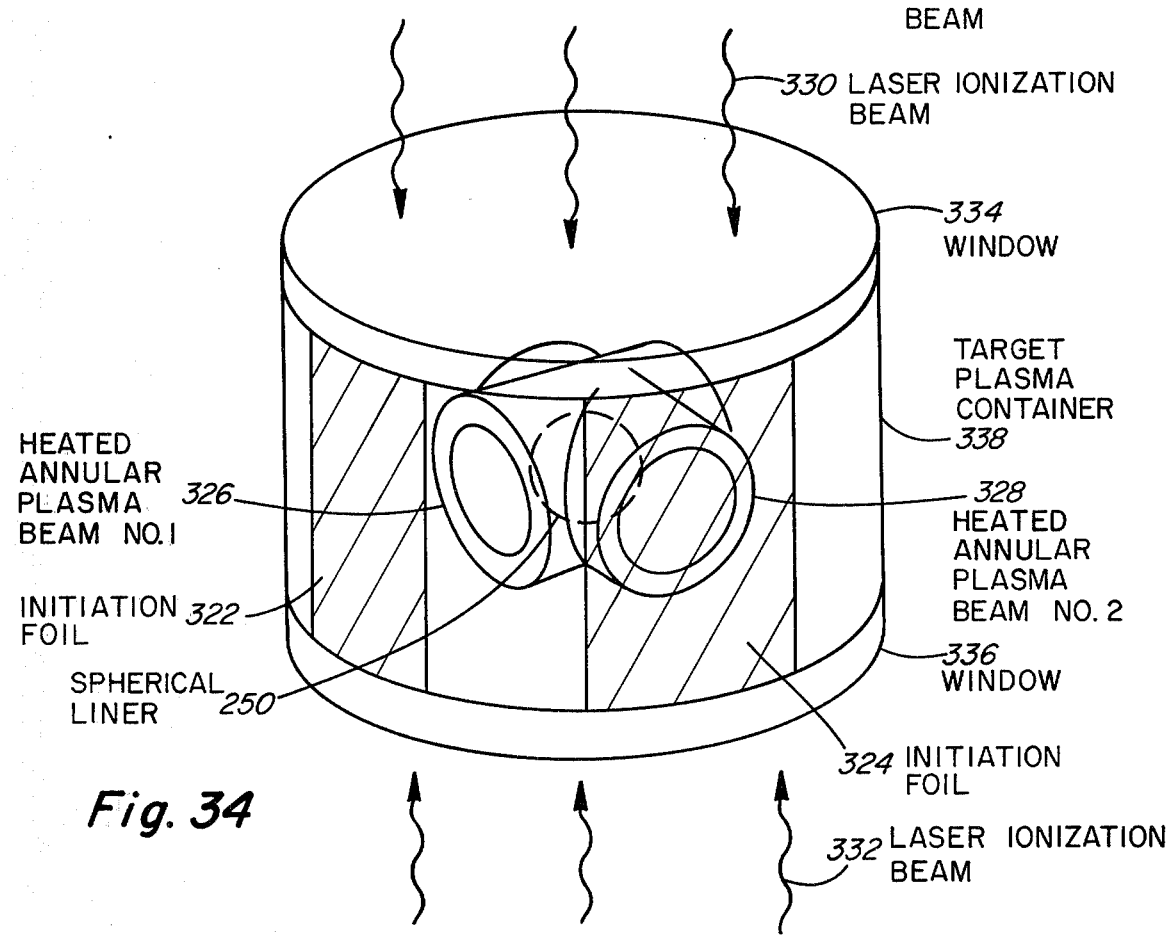
FIG. 34 is a schematic illustration of the target geometry utilizing two annular relativistic electron beams to drive a spherical liner, in the manner in FIG. 14.

Target geometry, utilizing two annular relativistic electron beams to drive a spherical liner 250 is schematically illustrated in FIG. 34. In operation, beam deflection is minimized as beams 362 and 328 pass through the beam driven azimuthal magnetic field regions, as indicated in FIG. 14.

The approach of obtaining an intense radiation, neutron and/or alpha particle source disclosed in the above referenced copending application Ser. No. 9,702 filed Feb. 5, 1979, by Lester E. Thode is to use a high-density, multi-kilovolt relativistic electron beam produced plasma to drive a fast liner, which then produces an intense, shaped energy pulse suitable for imploding a structured microsphere such as disclosed by R. J. Mason, Phys. Fluids 18, 814 (1975) and Los Alamos Scientific Report LA-5898-MS (October 1975), S. D. Bertke et al., Nucl. Fusion 18, 509 (1978), and G. S. Fraley et al., Phys. Fluids 17, 474 (1974). Such a microsphere can be filled with either DT, DD, $DHe^3$, $HLi^6$, or $HB^{11}$, or some mixture thereof for example.

Figure 35:
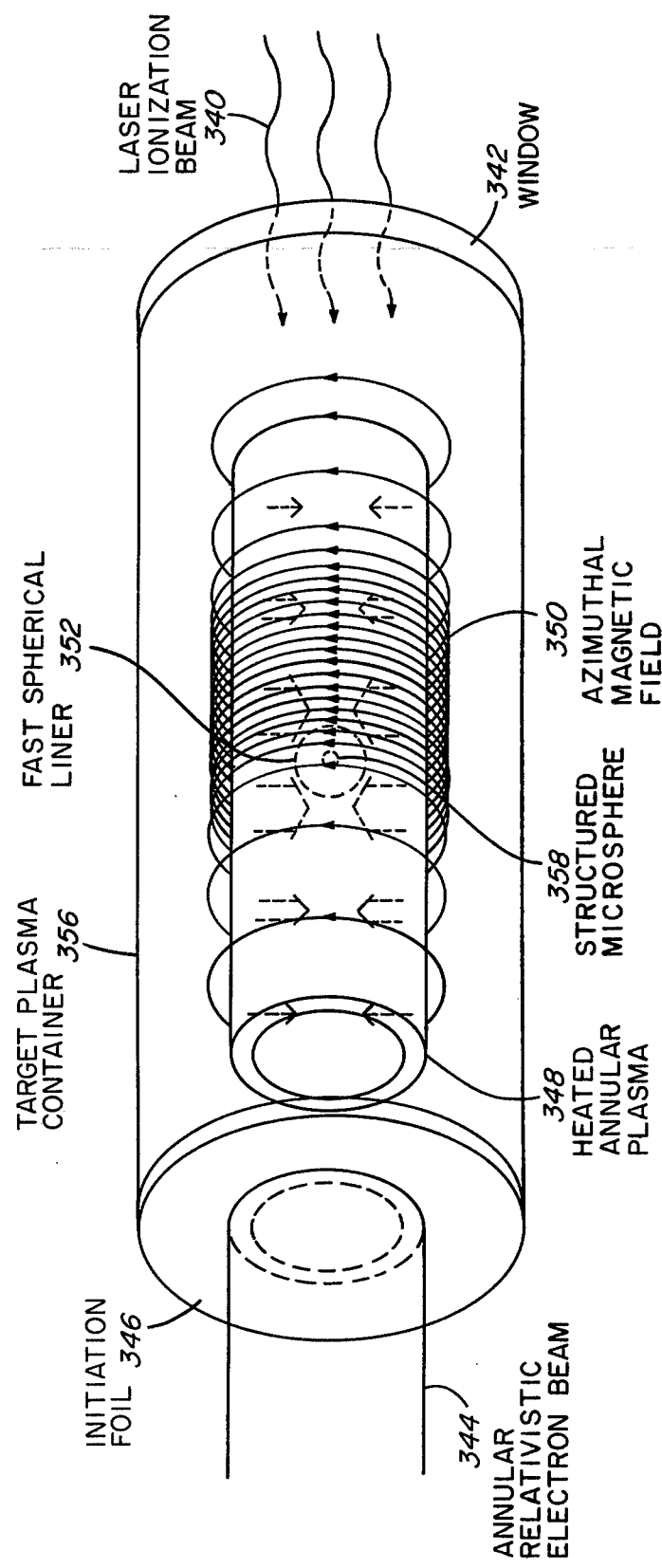
FIG. 35 is a schematic illustration of the basic geometry for fast spherical liner implosion of a structured microsphere.
Figure 36:
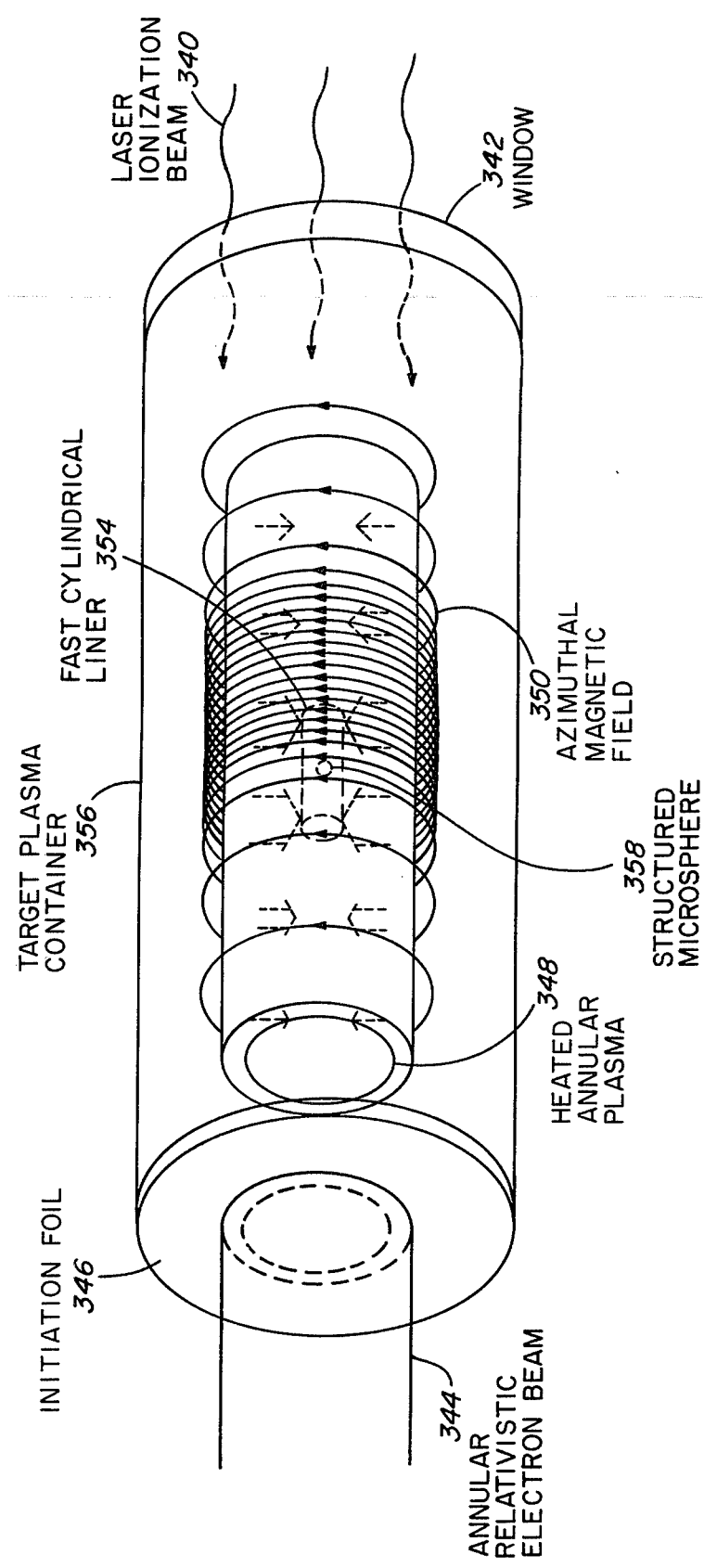
FIG. 36 is a schematic illustration of the basic geometry for fast cylindrical liner implosion of a structured microsphere.

The basic geometry of the approach disclosed is illustrated in FIGS. 35 and 36, for a single laser ionization beam 340 entering through window 342. The multiple laser ionization configurations as shown in FIGS. 25 and 26 can also be used. As pointed out above, the use of lasers for preionization, lowers the relativistic electron beam technology requirements. Therefore, the laser ionization sources should be considered as optional.

An annular relativistic electron beam 344 penetrates the initiation foil 346, which also acts as an end plug to contain the low-temperature plasma. As the voltage and current density rise, the anomalous coupling coefficient increases to its optimal value, and the beam transfers a large fraction of its energy and momentum to the annular plasma region 348. The beam driven azimuthal magnetic field 350 in turn directs annular plasma 348 thermal energy to the fast spherical line 352 of FIG. 35 or fast cylindrical liner 354 of FIG. 36. Since the source of the azimuthal magnetic field 350 is the result of an axial current flow in the annular plasma 348, resulting from conservation of momentum, the azimuthal magnetic field 350 is not present in the vicinity of the fast spherical liner 352 or fast cylindrical liner 354. The presence of an axial external magnetic field generated by source 110 of FIG. 12 can be used to increase the anomalous coupling coefficient. However, since the annular plasma column 348 and plasma engulfing the liner are very high beta, the external magnetic field generated by source 110 of FIG. 12 is rapidly excluded.

The radial wall of the plasma target container 356 is sufficiently thick to ensure magnetic flux containment and sufficiently massive to provide radial inertial confinement (tamper) on the relativistic electron beam time scale, i.e. $\lesssim 100$ ns. Thus, radial energy loss to the container wall is limited by both the azimuthal magnetic field 350 and excluded external magnetic field generated by source 110 of FIG. 12. Heat conduction is limited axially on the beam time scale by the lower axial temperature gradient, azimuthal magnetic field 350, and self-mirroring of the external magnetic field generated by source 110. Thus, the geometry takes advantage of anomalous coupling and classical heat conduction to rapidly and efficiently remove energy from the relativistic electron beam 344 and transport that energy to the fast liners 352 and 354.

Figure 37:
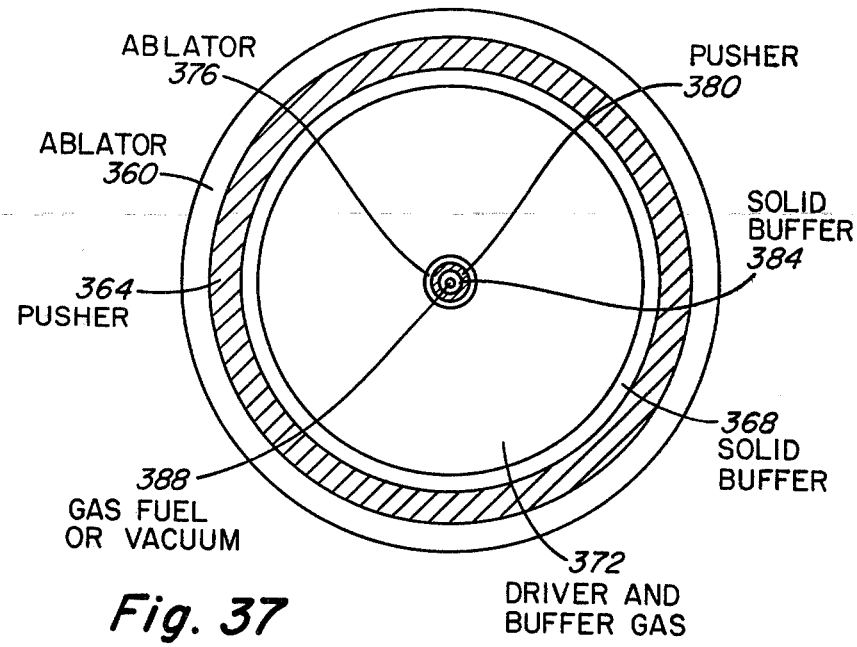
FIG. 37 is a schematic illustration of a cross-sectional view of a fast spherical liner and a structured microsphere.
Figure 38:
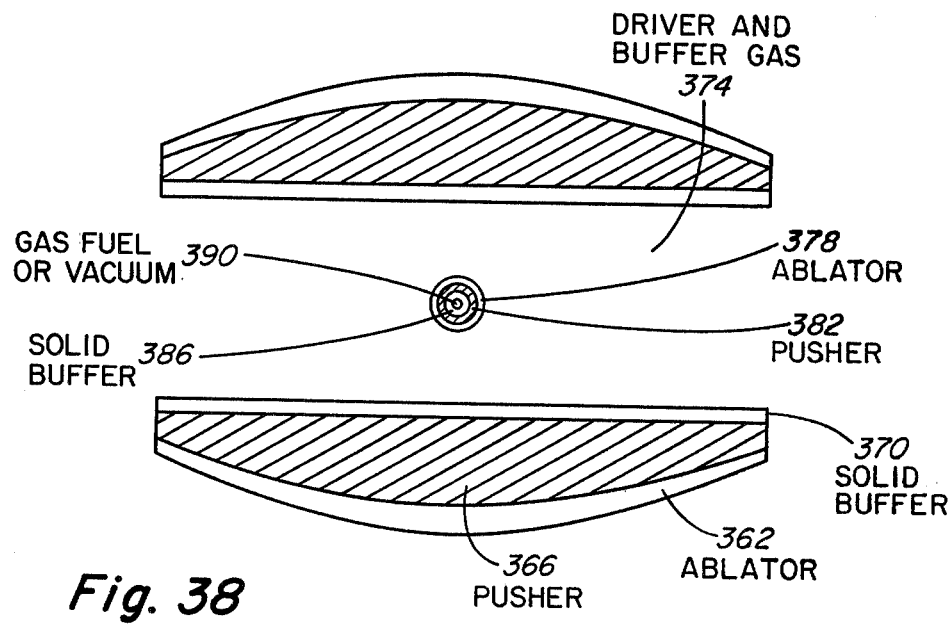
FIG. 38 is a schematic illustration of a cross-sectional view of a fast cylindrical liner and a structured microsphere.

As shown in FIGS. 37 and 38, the fast liners 352 and 354 consist of ablators 360 and 362, pushers 364 and 366, and solid buffer 368 or 370. The ablator is boiled off through heat conduction, with the pusher and solid buffer propelled to high implosion velocity. The ablators 360 and 362 are low Z, low mass density material such as LiDT, Be, $ND_3BT_3$, boron hydride, or CDT. Pushers 364 and 366 are typically a higher Z and mass density material such as glass, aluminum, gold, nickel or plastic embedded with high Z atoms. Solid DT or LiDT can be used for solid buffers 368 and 370. Depending upon the implosion velocity desired and stability considerations, the total mass of fast liners 352 and 354 illustrated in FIGS. 37 and 38, respectively, is from 1 milligram to 100 milligrams. Also, the driver gs 372 and 374 of FIGS. 37 and 38, respectively, may comprise DT, DD, or higher Z gas such as $N_2$, Ar, or Kr.

In operation, as the liner collapses, the density and temperature of buffer gases 372 and 374 in contact with the microsphere 358, increases in time. Such pulse shaping, which is different for fast spherical liner 352 and fast cylindrical liner 354, allows shock overtaking as pointed out in the above reference articles by R. J. Mason et al. and S. D. Berke et al., producing high compression of the ablatively driven microsphere 358. Using the high-density thermal gas 372 and 374 of FIGS. 37 and 38, respectively, for implosion, reduces the preheating problem associated with the microsphere 358.

Basic detail of the microsphere 358 is shown in FIGS. 37 and 38. The materials used for ablators 376 and 378, pushers 380 and 382, solid buffers 384 and 386, and gas fuel 388 and 390 are similar to those set forth for liners 352 and 354. Also, multiple pusher configurations utilizing velocity multiplication to obtain very high implosion velocities can also be incorporated into the structural microsphere 358.

Various radiation devices, according to the present invention, can be fabricated depending upon the specific application for the device. Basically, the concept of one embodiment of the present invention is to generate a kilovolt high-density plasma to heat high Z materials of various sizes and shapes to generate radiation.

For example, FIGS. 39 and 40 illustrate a soft x-ray source in which a wire array is engulfed by a high-density, multi-kilovolt plasma 390 produced by an annular relativistic electron beam such as beam 76 illustrated in FIG. 12. The device of FIGS. 39 and 40 could be directly attached to the drift tube 78 or modulator 80 of FIG. 12.

The target plasma container 394 is a simple cylinder which is lined with a high Z material 396. A beryllium window 398 is provided for radiation extraction. A wire array 392 is supported by the initiation foil 400 and end plug 402. The size, shape, and number of wires in the array 392 depends upon the opacity of the materials. Wires of aluminum, titanium, tantalum, tungsten, or stainless steel with diameters of 5 to 100 $\mu$m appear suitable. Such an array is designed to have has a low opacity in the direction of the beryllium window 398.

Due to the compact size and directional properties of the above device it can be operated as a module in a configuration producing megajoule level radiation with a 10 ns to 100 ns pulse length. Additionally, either annular or solid relativistic electron beams can be utilized depending upon the particular array of high Z material used.

Moreover, a moderate Z gas such as $N_2$ or Ar or a mixture of low Z gas such as $H_2$ and high Z gas such as Kr or Xe with an electron density of $10^{17}$–$10^{19}$ electrons/cm$^3$, can be used as the target plasma 68 of the device of FIG. 11 to produce radiation. In the radiation mode, beryllium windows in the target plasma container are used and the low-density gas chamber 52 of FIG. 11 is eliminated. Such a tunable radiation source is suitable for a variety of applications and can be used with a solid beam as illustrated in FIG. 11 or an annular beam as illustrated in FIG. 12. Also, the frequency of the radiation can be adjusted by varying the plasma temperature.

The present invention therefore provides a device for producing intense radiation which is easy to implement within current technological limitations. By optimizing the extremely powerful streaming instabilities to heat the high-density plasma with the relativistic electron beam according to method (a), the present invention provides efficient deposition of beam energy to heat the plasma to multi-kilovolt temperatures to, in turn, heat the high Z materials to produce an intense source of radiation.

Also, the present invention provides a tunable source of intense radiation utilizing a moderate Z gas such as $N_2$ or Ar as the target plasma which is easy and inexpensive to implement with currently available technology.

Obviously, many modifications and variations of the present invention are possible in light of the above teachings. It is therefore to be understood that within the scope of the appended claims the invention may be practiced otherwise than as specifically described and that subject matter disclosed herein shall not be precluded from being later claimed in the present application or a continuation, continuation-in-part, or reissue application.

What is desired to be secured as Letters Patent of the United States is:

1. A device for generating radiation comprising:
    means for generating relativistic electron beam having a voltage of at least 3 MeV, a current density of at least 1 kA/cm$^2$ and $(N\,re)/(1-v^2/c^2)^{\frac{1}{2}} \leq 1$ where N is the line density of beam electrons, re is the classical electron radius, v is the beam velocity and c is the speed of light,
    a target plasma chamber containing a high-density gas;
    a high Z material disposed in said target plasma chamber;
    means for ionizing said high-density gas to generate a high-density plasma;
    means for initiating convective oscillations in said plasma upon application of said relativistic electron beam such that streaming instabilities are produced in said plasma causing electron beam energy to be deposited in said plasma to heat said plasma to kilovolt temperatures and heat said high Z material to generate an intense source of radiation.

2. The device of claim 1 wherein said high Z material comprises a wire array.

3. A device for producing energy in the form of radiation comprising:
   a high-density plasma disposed within a target chamber;
   a high Z material disposed within said target chamber;
   means for producing relativistic electron beam having a current density of at least 1 KA/cm$^2$ and a $(N\,re)/(1-v^2/c^2)^{\frac{1}{2}} \leq 1$ where N is the line density of beam electrons, re is the classical electron radius, v is the beam velocity and c is the speed of light, and having a voltage of at least 3MeV, which beam is sufficient to penetrate said target chamber and initiate convective oscillations in said high-density plasma such that energy is transferred from said relativistic electron beam to said plasma to heat said plasma to kilovolt temperatures which, in turn, heats said high Z material to generate said radiation.

4. The device of claim 3 wherein said high-density plasma comprises DT.

5. The device of claim 3 wherein said high-density plasma comprises DD.

6. The device of claim 3 wherein said high-density plasma comprises $H_2$.

7. The device of claim 3 wherein said high Z material comprises a wire array.

8. An x-ray device comprising:
   means for retaining a high-density gas within a predetermined volume;
   means for ionizing said gas to produce a high-density plasma;
   a high Z material disposed within said means for retaining said high-density gas;
   means for generating relativistic electron beam having at least a 3MeV voltage sufficiently high to overcome classical scattering upon penetrating said means for retaining said high-density gas so as to generate streaming instabilities in said high-density plasma causing said relativistic electron beam to heat said high-density plasma to kilovolt temperatures to heat said high Z material to generate x-rays and having a current density of at least 1 KA/cm$^2$ and $(N\,re)/(1-v^2/c^2)^{\frac{1}{2}} \leq 1$ where N is the line density of the beam electrons, re is the classical electron radius, v is the beam velocity and c is the speed of light.

9. The x-ray device of claim 8 wherein said relativistic electron beam is an annular relativistic electron beam surrounding said high Z material.

10. The x-ray device of claim 9 wherein said high Z material comprises a wire array.

11. The x-ray device of claim 8 wherein said relativistic electron beam comprises a solid beam surrounded by said high Z material.

12. The device of claim 8 wherein said high-density plasma comprises DT.

13. The device of claim 8 wherein said high-density plasma comprises DD.

14. The device of claim 8 wherein said high-density plasma comprises $H_2$.

15. A method of producing radiation comprising:
   confining a high-density gas within a target chamber;
   ionizing said gas to produce a high-density plasma;
   generating an annular relativistic electron beam having at least a 3 MeV voltage sufficiently high to penetrate said target chamber without scattering to produce streaming instabilities in said plasma causing said electron beam to heat said high-density plasma to kilovolt temperatures which, in turn, heats a high Z material to generate radiation and having a current density of at least 1 KA/cm$^2$ and $(N\,re)/(1-v^2/c^2)^{\frac{1}{2}} \leq 1$ where N is the line density of beam electrons, re is the classical electron radius, v is the beam velocity and c is the speed of light.

16. A device for generating radiation comprising:
   means for generating relativistic electron beam having a voltage of at least 3 MeV, a current density of at least 1 kA/cm$^2$ and $(Nre)/(1-v^2/c^2)^{\frac{1}{2}} \leq 1$ where N is the line density of the beam electrons, re is the classical electron radius, v is the beam velocity and c is the speed of light,
   a target plasma chamber containing a high-density Z gas;
   means for ionizing said high-density gas to generate a plasma;
   means for initiating convective oscillations in said plasma upon application of said relativistic electron beam such that streaming instabilities are produced in said plasma causing electron beam energy to be deposited in said plasma to heat said plasma to kilovolt temperatures and generate radiation.

17. The device of claim 16 wherein said high-density gas comprises Ar.

18. The device of claim 16 wherein said means for ionizing said high-density gas comprises at least one laser.

19. The device of claim 16 wherein said high-density gas comprises a mixture of high Z gas and a low Z gas.

20. The device of claim 19 wherein said high Z gas comprises Kr and said low Z gas comprises $H_2$.

21. The device of claim 16 wherein said means for initiating convective oscillations comprises a thin, low-density foil.

22. A device for producing energy in the form of radiation comprising:
   a high-density plasma disposed within a target chamber;
   means for producing relativistic electron beam having a current density of at least 1 KA/cm$^2$ and $(N\,re)/(1-v^2/c^2)^{\frac{1}{2}} \leq 1$ where N is the line density of the beam electrons, re is the classical electron radius, v is the beam velocity and c is the speed of light and a having, a voltage of at least 3MeV, which beam is sufficient to penetrate said target chamber and initiate convective oscillations in said high-density plasma such that energy is transferred from said relativistic electron beam to said plasma to heat said plasma to kilovolt temperatures and generate radiation.

23. The device of claim 22 wherein said relativistic electron beam is a solid beam.

24. The device of claim 22 wherein said relativistic electron beam comprises an annular beam.

25. A radiation device comprising:
   means for retaining a high-density gas within a predetermined volume;
   means for ionizing said gas to produce a high-density plasma;
   means for generating electron beam having at least a 3MeV voltage sufficiently high to overcome classical scattering upon penetrating said means for retaining said high-density gas so as to generate streaming instabilities in said high-density, plasma causing said relativistic electron beam to heat said high-density plasma to kilovolt temperatures to generate a tunable source of radiation and having a current density of at least 1 KA/cm$^2$ and $(N\ re)/(1-v^2/c^2)^{\frac{1}{2}} \leq 1$, where N is the line density of the beam electrons, re is the classical electron radius, v is the beam velocity and c is the speed of light.

26. The device of claim 25 wherein said high-density gas comprises a mixture of a high Z gas and a low Z gas.

27. The device of claim 26 wherein said high Z gas comprises Kr and said low Z gas comprises $H_2$.

28. The device of claim 25 wherein said high-density, gas comprises Ar.

29. A method of producing radiation comprising:
confining a high-density gas within a target chamber;
ionizing said gas to produce a high-density plasma;
generating an annular relativistic electron beam having at least a 3MeV voltage sufficiently high to penetrate said target chamber without scattering to produce streaming instabilities in said plasma causing said electron beam to heat said high-density, plasma to generate a tunable source of radiation and having a current density of at least 1 KA/cm$^2$ and $(N\ re)/(1-v^2/c^2)^{\frac{1}{2}} \leq 1$, where N is the line density of the beam electrons, re is the classical electron radius, v is the beam velocity and c is the speed of light.

30. The method of producing radiation according to claim 29 further comprising the step of:
varying the temperature of said high-density plasma to tune said source of radiation to various frequencies.

* * * * *